(12) United States Patent
Demartin Maeder et al.

(10) Patent No.: US 11,891,527 B2
(45) Date of Patent: Feb. 6, 2024

(54) MACHINE READABLE SECURITY FEATURES

(71) Applicant: SICPA HOLDING SA, Prilly (CH)

(72) Inventors: Marlyse Demartin Maeder, La Sarraz (CH); Claude-Alain Despland, Prilly (CH)

(73) Assignee: SICPA HOLDING SA, Prilly (CH)

(*) Notice: Subject to any disclaimer, the term of this patent is extended or adjusted under 35 U.S.C. 154(b) by 150 days.

(21) Appl. No.: 17/055,851

(22) PCT Filed: Feb. 19, 2019

(86) PCT No.: PCT/EP2019/054055
§ 371 (c)(1),
(2) Date: Nov. 16, 2020

(87) PCT Pub. No.: WO2019/219250
PCT Pub. Date: Nov. 21, 2019

(65) Prior Publication Data
US 2021/0138823 A1 May 13, 2021

(30) Foreign Application Priority Data
May 15, 2018 (EP) .................................. 18172309

(51) Int. Cl.
*C09D 11/10* (2014.01)
*C09D 11/101* (2014.01)
(Continued)

(52) U.S. Cl.
CPC ............. *C09D 11/101* (2013.01); *B41M 3/14* (2013.01); *B41M 3/144* (2013.01);
(Continued)

(58) Field of Classification Search
CPC ....... B41M 3/14; B41M 3/144; C09D 11/101; C09D 11/033; C09D 11/037; C09D 11/322
(Continued)

(56) References Cited

U.S. PATENT DOCUMENTS 5,828,394 A   10/1998   Khuri-Yakub et al.
6,394,363 B1   5/2002   Arnott et al.
(Continued)

FOREIGN PATENT DOCUMENTS

EP   0 119 425   1/1990
EP   0 340 163   12/1992
(Continued)

OTHER PUBLICATIONS

Sliney D. H., "What is light?, The visible spectrum and beyond" Eye (the Scientific Journal of the Royal College of Ophtalmologists, 2016, 30(2), pp. 222-229).
(Continued)

*Primary Examiner* — Betelhem Shewareged
(74) *Attorney, Agent, or Firm* — Muncy, Geissler, Olds & Lowe, P.C.

(57) ABSTRACT

The present invention relates to the field of security inks suitable for printing machine readable security features on substrate, security documents or articles as well as machine readable security feature made from said security inks, and security documents comprising a machine readable security feature made from said security inks. In particular, the invention provides security inks comprising one or more IR absorbing materials selected from the group consisting of crystal water-free iron(II) orthophosphates of the general formula $Fe_3(PO_4)_2$ and having a graftonite crystal structure, crystal water-free iron(II) metal orthophosphates, crystal water-free iron(II) metal phosphonates, crystal water-free
(Continued)

iron(II) metal pyrophosphates, crystal water-free iron(II) metal metaphosphates of the general formula $Fe_aMet_b(PO_c)_d$, wherein said security ink is an oxidative drying security ink, a UV-Vis curable security ink, a UV-Vis curable security ink or a combination thereof.

20 Claims, 3 Drawing Sheets

(51) Int. Cl.
 *B41M 3/14* (2006.01)
 *C09D 11/033* (2014.01)
 *C09D 11/037* (2014.01)
 *C09D 11/322* (2014.01)

(52) U.S. Cl.
 CPC .......... *C09D 11/033* (2013.01); *C09D 11/037* (2013.01); *C09D 11/322* (2013.01)

(58) Field of Classification Search
 USPC ....................................................... 428/32.1
 See application file for complete search history.

(56) References Cited

U.S. PATENT DOCUMENTS

| | | | |
|---|---|---|---|
| 8,226,213 B2 | 7/2012 | McAvoy et al. | |
| 9,517,622 B2 | 12/2016 | Kuramochi et al. | |
| 2004/0082460 A1* | 4/2004 | Yamane | G02B 5/226 501/48 |
| 2008/0241492 A1* | 10/2008 | Demartin Maeder | B41M 3/14 106/31.13 |
| 2015/0014983 A1 | 1/2015 | Decoux et al. | |
| 2019/0077676 A1* | 3/2019 | Nakayama | C01G 41/006 |
| 2021/0138823 A1* | 5/2021 | Demartin Maeder | B41M 3/144 |

FOREIGN PATENT DOCUMENTS

| | | |
|---|---|---|
| EP | 1 790 701 | 5/2007 |
| EP | 2 014 729 | 1/2009 |
| EP | 2 125 713 | 4/2012 |
| EP | 2 626 215 | 8/2013 |
| JP | 05093160 | 4/1993 |
| JP | 2005268655 | 9/2005 |
| JP | 2006268469 | 10/2006 |
| JP | 2011178009 | 9/2011 |
| JP | 2015526311 | 9/2015 |
| WO | 2002/100960 | 12/2002 |
| WO | 2007/060133 | 5/2007 |
| WO | 2010/115986 | 10/2010 |
| WO | 2013185950 | 12/2013 |
| WO | 2016/005158 | 1/2016 |
| WO | 2016121842 | 8/2016 |

OTHER PUBLICATIONS

"Chemistry & Technology of UV & EB Formulation for Coatings, Inks & Paints", Vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
The Printing ink manual, R.H. Leach and R.J. Pierce, Springer Edition, 5th Edition, 2008, pp. 58-62.
Printing Technology, J.M. Adams and P.A. Dolin, Delmar Thomson Learning, 5th Edition, 2002, pp. 293-328.
Printing Technology, J.M. Adams and P.A. Dolin, Delmar Thomson Learning, 5th Edition, 2002, pp. 359-360.
"Handbook of print media", Helmut Kipphan, Springer Edition, 2001, p. 48.
International Search Report and Written Opinion dated Apr. 18, 2019 issued with respect to application No. PCT/EP2019/054055.
European Office Action in counterpart European Application No. 18172309.9 dated Oct. 4, 2018.
Japan Patent Office in counterpart Japan Application No. P2020-563990 dated Oct. 4, 2022 (and English language translation of Office Action).

* cited by examiner

MACHINE READABLE SECURITY FEATURES

The present invention relates to the field of security inks suitable for printing machine readable security features on substrate, in particular on security documents or articles.

BACKGROUND OF THE INVENTION

With the constantly improving quality of color photocopies and printings and in an attempt to protect security documents such as banknotes, value documents or cards, transportation tickets or cards, tax banderols, and product labels that have no reproduceable effects against counterfeiting, falsifying or illegal reproduction, it has been the conventional practice to incorporate various security means features in these documents.

Security features, e.g. for security documents, can be classified into "covert" and "overt" security features. The protection provided by covert security features relies on the concept that such features are hidden, typically requiring specialized equipment and knowledge for their detection, whereas "overt" security features are easily detectable with the unaided human senses, e.g. such features may be visible and/or detectable via the tactile senses while still being difficult to produce and/or to copy.

Machine readable inks, such as for example magnetic inks, luminescent inks and IR absorbing inks, have been widely used in the field of security documents, in particular for banknotes printing, to confer the security document an additional covert security feature. The protection of security document against counterfeit and illegal reproduction provided by covert security features relies on the concept that such features typically require specialized equipment and knowledge for their detection. In the field of security and protecting value documents and value commercial goods against counterfeiting, falsifying and illegal reproduction, it is known in the art to apply machine readable security inks by different printing processes including printing processes using highly viscous or pasty inks such as offset printing, letterpress printing and intaglio printing (also referred in the art as engraved steel die or copper plate printing), liquid inks such as rotogravure printing, flexography printing, screen printing and inkjet printing.

Security features comprising infrared (IR) absorbing materials are widely known and used in security applications. Commonly used IR absorbing materials in the field of security are based on the absorption of electromagnetic radiation due to electronic transitions in a spectral range between 780 nm and 1400 nm (range provided by CIE (Commission Internationale de l'Eclairage)), this part of the electromagnetic spectrum being usually referred to as the NIR-domain. For example, IR absorbing features have been implemented in banknotes for use by automatic currency processing equipment, in banking and vending applications (automatic teller machines, automatic vending machines, etc.), in order to recognize a determined currency and to verify its authenticity, in particular to discriminate it from replicas made by color copiers. IR absorbing materials include organic compounds, inorganic materials, glasses comprising substantial amounts of IR-absorbing atoms or ions. Typical examples of IR absorbing compounds include among others carbon black, quinone-diimmonium or ammonium salts, polymethines (e.g. cyanines, squaraines, croconaines), phthalocyanine or naphthalocyanine type (IR-absorbing pi-system), dithiolenes, quaterrylene diimides, metal (such as for example transition metal or lanthanide) salts (such as for example fluorides, chlorides, bromides, iodides, nitrates, nitrites, sulfites, sulfates, phosphates, carbonates, borates, benzoates, acetates, chromates, hexaborides, molybdates, manganates, ferrates, organosulfates, organosulfonates, organophosphonates, organophosphates and phosphono-tungstanates), metal oxides (such as for example indium tin oxide, antimony tin oxide in nanoparticulate form, and doped tin(IV) oxide), metal nitrides.

Due to its strong absorption in the visible domain, carbon black is not a preferred security material since, because of its strong absorption in the visible domain, it limits the freedom for realizing designs of a security document to be protected against counterfeit or illegal reproduction.

Ideally, security features comprising infrared (IR) absorbing materials for authentication purposes should not absorb in the visible range (400 nm to 700 nm), such as to allow its use in all types of visibly colored inks and also in markings which are invisible to the naked eye, and at the same time display a strong absorption in the near-infrared range (700 nm to 1400 nm), such as to allow its easy recognition by standard currency processing equipment.

Organic NIR absorbers are usually of limited use in security applications because of their inherent low thermal stability and the complexity of their production.

Inorganic IR absorbing compounds exhibiting improved properties have been disclosed in WO 2007/060133 A2, wherein security inks have been developed to produce security features whose design freedom is not limited by the absorption of said IR absorbing compounds in the visible range of the electromagnetic spectrum. WO 2007/060133 A2 discloses intaglio printing inks comprising an IR absorbing material consisting of a transition element compound whose IR-absorption is a consequence of electronic transitions within the d-shell of transition element atoms or ions. In particular, WO 2007/060133 A2 discloses copper(II) phosphates, Cu(II) pyrophosphates copper(II) metaphosphate, hydrated iron(II) phosphate ($Fe_3(PO_4)_2 \cdot 8H_2O$, Vivianite), hydrated nickel(II) phosphate ($Ni_3(PO_4)_2 \cdot 8H_2O$) and $Ca_2Fe(PO_4)_2 \cdot 4H_2O$ (Anapaite) as IR absorbing materials.

Therefore, a need remains for security inks comprising an IR absorbing material for printing machine readable security features, which have advantages over the prior art and are similarly suitable or even more suitable than known IR absorbers in terms of the absorption of NIR radiation and at the same time have high chemical stability, high reflectance in the visible range and do not raise toxicological or ecological concerns.

SUMMARY

Accordingly, it is an object of the present invention to overcome the deficiencies of the prior art as discussed above.

In a first aspect, the present invention provides a security ink for printing a machine readable security feature, said security ink comprising one or more IR absorbing materials selected from the group consisting of crystal water-free iron(II) orthophosphates of the general formula $Fe_3(PO_4)_2$
and having a graftonite crystal structure,
crystal water-free iron(II) metal orthophosphates,
crystal water-free iron(II) metal phosphonates,
crystal water-free iron(II) metal pyrophosphates,
crystal water-free iron(II) metal metaphosphates of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Ca, Sr, Ba, the transition metals (d block), in particular Sc, Y, La, Ti, Zr, Hf, Nb, Ta, Cr, Mo, W, Mn, Cu, Zn, Co, Ni, Ag, Au, the metals and semimetals of the third, fourth and fifth main groups, in particular B, Al, Ga, In, Si, Sn, Sb, Bi and the lanthanoids, and
mixtures thereof
wherein said security ink is
an oxidative drying security ink comprising from about 0.01 wt-% to about 10 wt-% of one or more driers, the weight percents being based on the total weight of the oxidative drying security ink, or
a UV-Vis curable security ink comprising from about 0.1 wt-% to about 20 wt-% of one or more photoinitiators, the weight percents being based on the total weight of the UV-Vis curable security ink, or
a thermal drying security ink comprising from about 10 wt-% to about 90 wt-% of one or more solvents selected from the group consisting of organic solvents, water and mixtures thereof, or
a combination thereof.

Also described and claimed therein are machine readable security feature made from the security ink described herein and methods for producing said machine readable security features, said methods comprising a step a) of applying, preferably by a printing process selected from the group consisting of intaglio printing, screen printing, flexography printing, rotogravure printing and flextensional inkjet printing, the security ink described herein onto a substrate Also described and claimed therein are security documents comprising the machine readable security feature and security document comprising a first portion consisting of the machine readable security feature described herein and a second portion consisting of a security feature made of an ink comprising one or more compounds absorbing in another region of the electromagnetic spectrum (UV or Vis) or consisting of security feature made of a machine readable magnetic ink comprising one or more magnetic compounds so as to form said combined security feature.

Also described and claimed therein are methods for authenticating the security document described herein, said methods comprising the steps of:
  a) providing the security document described herein and comprising the machine readable security feature made of the ink described herein;
  b) illuminating the machine readable security feature at at least two wavelengths, wherein one of said at least two wavelengths is in the visible range and another one of said at least two wavelengths is in the NIR range,
  c) detecting the optical characteristics of the machine readable security feature through sensing of light reflected by said machine readable security feature at at least two wavelengths, wherein one of said at least two wavelengths is in the visible range and another one of said at least two wavelengths is in the NIR range, and
  d) determining the security document authenticity from the detected optical characteristics of the machine readable security feature.

Surprisingly, it was found that the use of the IR absorbing materials described herein in security inks combine high absorption properties in the NIR range, high reflectance in the visible range and high chemical stability.

The IR absorbing materials described herein can be manufactured relatively easily and for comparatively low costs and are characterized for example by a high chemical stability compared to organic or metal organic absorbers. They are crystal water-free, resulting in all of the radiation being absorbed by the actual complex rather than some of it being absorbed by the crystal water. Furthermore, security inks comprising said one or more IR absorbing materials exhibit particularly high absorption in the NIR range while being highly reflective in the visible range..

DETAILED DESCRIPTION

Figure 1A:
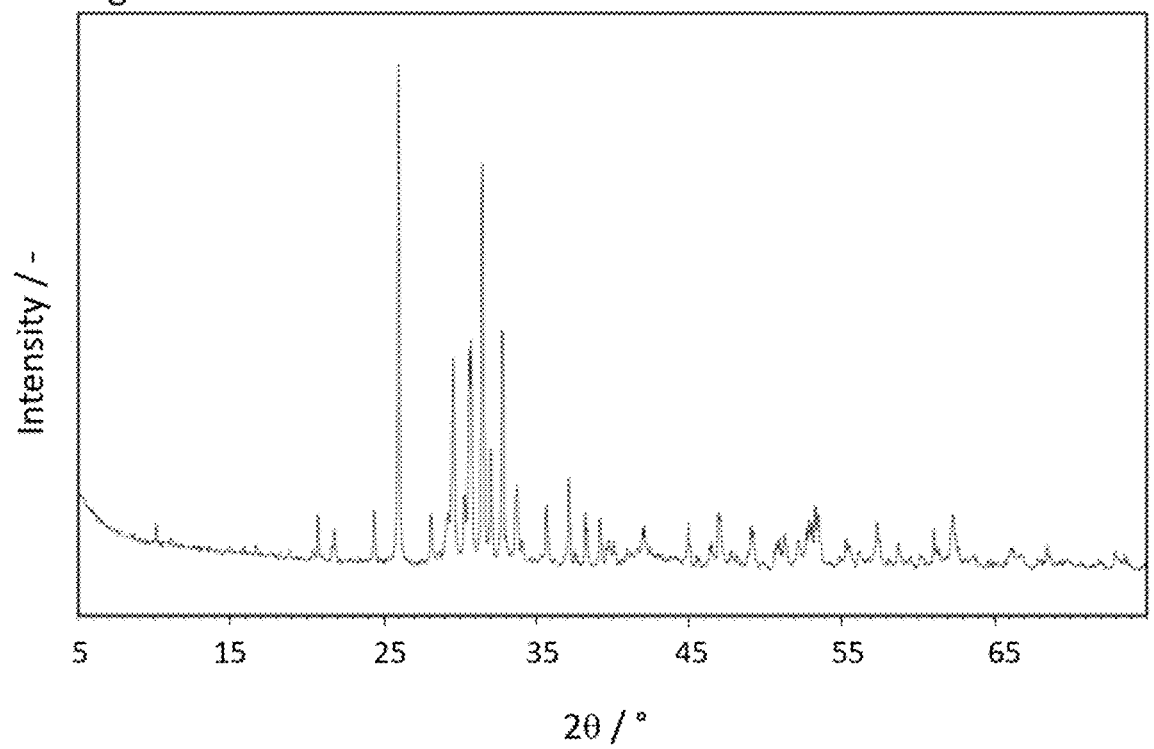
FIG. 1A-B show x-ray diffractograms (XRD) of crystal water-free $Fe_3(PO_4)_2$ with a graftonite structure (IR-absorbing material IR-A 1, FIG. 1A) and of crystal water-free $KFePO_4$ (IR-absorbing material IR-A 2, FIG. 1B).

The following definitions are to be used to interpret the meaning of the terms discussed in the description and recited in the claims.

As used herein, the article "a" indicates one as well as more than one and does not necessarily limit its referent noun to the singular.

As used herein, the terms "about" means that the amount or value in question may be the value designated or some other value about the same. The phrases are intended to convey that similar values within a range of ±5% of the indicated value promote equivalent results or effects according to the invention.

As used herein, the term "and/or" or "or/and" means that either all or only one of the elements of said group may be present. For example, "A and/or B" shall mean "only A, or only B, or both A and B".

As used herein, the term "at least" is meant to define one or more than one, for example one or two or three.

The term "security document" refers to a document which is usually protected against counterfeit or fraud by at least one security feature. Examples of security documents include without limitation value documents and value commercial goods.

The expression "ultraviolet" (UV) is used to designate the spectral range between 100 and 400 nm, "visible" (Vis) is used to designate the spectral range between 400 and 700 nm, "infrared" (IR) is used to designate the spectral range between 780 nm and 15000 nm wavelength, and near infrared (NIR) is used to designate the spectral range between 780 nm and 1400 nm wavelength (ranges provided by CIE (Commission Internationale de l'Eclairage), cited in Sliney D. H., Eye (the Scientific Journal of the Royal College of Ophtalmologists, 2016, 30(2), pages 222-229).

The present invention further provides security inks comprising the one or more IR absorbing materials described therein for printing machine readable security features. As used herein, the term "machine readable security feature" refers to an element which exhibits at least one distinctive property which is detectable by a device or machine and which can be comprised in a layer so as to confer a way to authenticate said layer or article comprising said layer by the use of a particular equipment for its authentication.

The machine readable properties of the security feature described herein are embodied by the one or more absorbing materials described herein that are comprised in the security ink described herein.

The machine readable security features comprising the one or more IR absorbing materials described herein advantageously exhibit high reflectance in the visible range (400 nm to 700 nm) and low reflectance in the near-infrared range (780 nm to 1400 nm), thus allowing an efficient authentication and recognition by a standard equipment and standard detectors including those featuring high-speed banknote sorting machines, since such detectors rely on the reflectance difference at selected wavelengths in the Vis and the NIR ranges.

The present invention further provides the use of the one or more IR absorbing materials described herein as machine readable compounds in the security inks described herein for printing a machine readable security features on the substrate described herein by a printing process preferably selected from the group consisting of intaglio printing, screen printing, rotogravure printing, flexography printing or flextensional inkjet printing.

The one or more IR absorbing materials described herein are preferably present in the security ink described herein in an amount from about 5 to about 60 wt-%, the weight percents being based on the total weight of the security ink.

The one or more IR absorbing materials described herein are suitable for producing machine readable security features by combining a) the presence of the bivalent iron and the phosphate anions or phosphonate anions and the lack of crystal water and b) the absence of an inversion center in the crystal structure of said materials. The one or more IR absorbing materials described herein do not have an inversion center, as is the case with the crystal water-free iron(II) orthophosphate with the formula $Fe_3(PO_4)_2$ with the graftonite structure but also in the case of mixed metal iron(II) compounds of the general formula $Fe_aMet_b(PO_c)_d$ described herein, wherein the Laporte rule no longer applies and absorption is correspondingly higher.

In the one or more IR absorbing materials, the phosphorous is present in oxidation stage (V). Low percentages of phosphorous in other stages of oxidation cannot be ruled out as a result of the manufacturing and should be covered by the protection in the scope of unavoidable impurities. The products according to the invention are derived from orthophosphoric acid ($H_3PO_4$) and its condensates (polymers). Orthophosphates have the anionic structural unit $[PO_4^{3-}]$, pyrophosphates and diphosphates have the structural unit $[P_2O_7^{4-}]$ and the cyclic metaphosphates have the structural unit=$[(PO_3^-)_n]$.

The one or more IR absorbing materials described herein are selected from the group consisting of crystal water-free iron(II) orthophosphates of the general formula $Fe_3(PO_4)_2$ and having a graftonite crystal structure, crystal water-free iron(II) metal orthophosphates, crystal water-free iron(II) metal phosphonates, crystal water-free iron(II) metal pyrophosphates, crystal water-free iron(II) metal metaphosphates of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Ca, Sr, Ba, the transition metals (d block), in particular Sc, Y, La, Ti, Zr, Hf, Nb, Ta, Cr, Mo, W, Mn, Cu, Zn, Co, Ni, Ag, Au, the metals and semimetals of the third, fourth and fifth main groups, in particular B, Al, Ga, In, Si, Sn, Sb, Bi and the lanthanoids; and mixtures thereof.

According to one embodiment, the security ink described herein comprises one or more IR absorbing materials being selected from the group consisting of crystal water-free iron(II) orthophosphates of the general formula $Fe_3(PO_4)_2$ and having the graftonite crystal structure. In other words, the security ink described herein comprises crystal water-free monometallic iron(II) orthophosphate of the general formula $Fe_3(PO_4)_2$, wherein the expression "monometallic" means that the product only contains iron(II) as a metallic (cationic) element. The graftonite crystal structure of the crystal water-free iron(II) orthophosphate with the formula $Fe_3(PO_4)_2$ has a crystal system being monocline, the space group being P21/c and the lattice constants being around a 8.81 Å, b 11.56 Å, c≈6,14 Å, α≈90,00°, β≈99,35°, γ≈90.00°. The unit cell contains eight formula units $Fe_{1.5}PO_4$. The phosphorous is tetrahedrally coordinated by the oxygen, and iron(II) occurs in three different four-fold layers (4e), each with different coordination geometries: 1× distorted octahedral, with one of the coordinated oxygen ions being significantly further away (d~2.68 Å), and 2× trigonal bipyramidal. The iron atoms in the graftonite system are therefore coordinated without an inversion center. Compared to other known crystal structures comprising crystal water (e.g. octahydrate vivianite $Fe_3(PO_4)_2·8H_2O$) or having an inversion center relative to the central iron atom (e.g. $Fe_3(PO_4)_2$ in the sarcopside crystal structure), the graftonite crystal structure of the crystal water-free iron(II) orthophosphate with the formula $Fe_3(PO_4)_2$ described herein exhibits improved performance.

According to another embodiment, the security ink described herein comprises one or more IR absorbing materials selected from the group consisting of crystal water-free iron(II) metal orthophosphates, crystal water-free iron(II) metal phosphonates, crystal water-free iron(II) metal pyrophosphates, crystal water-free iron (II) metal metaphosphates of the general formula $Fe_aMet_b(PO_c)_d$, and mixtures thereof, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Ca, Sr, Ba, the transition metals (d block), in particular Sc, Y, La, Ti, Zr, Hf, Nb, Ta, Cr, Mo, W, Mn, Cu, Zn, Co, Ni, Ag, Au, the metals and semimetals of the third, fourth and fifth main groups, in particular B, Al, Ga, In, Si, Sn, Sb, Bi and the lanthanoids. In other words, the security ink described herein comprises one or more IR absorbing materials selected from the group consisting of crystal water-free mixed metal iron(II) metal orthophosphates, crystal water-free iron(II) metal pyrophosphates or crystal water-free iron(II) metal metaphosphates of the general molecular formula $Fe_aMet_b(PO_c)_d$ described herein, wherein the expression "mixed metal" means that the product contains at least one further metal in addition to iron(II) as the metallic (cationic) components, and this is abbreviated to "Met" here.

Preferably, the security ink described herein comprises one or more IR absorbing materials selected from the group consisting of crystal water-free iron(II) metal orthophosphates, iron(II) metal phosphonates, iron(II) metal pyrophosphates or iron(II) metal metaphosphates of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Ca, Sr, Ba. Preferably, the security ink described herein comprises the crystal water-free iron(II) metal orthophosphate, iron(II) metal phosphonate, iron(II) metal pyrophosphate or iron(II) metal metaphosphate of the general formula $Fe_aMet_b(PO_c)_d$ described herein, wherein Met represents potassium (K), magnesium (Mg) and zinc (Zn) or a combination thereof, preferably potassium (K) alone or in combination with either magnesium (Mg) or zinc (Zn). More preferably, the crystal water-free iron(II) metal orthophosphate, crystal water-free iron(II) metal phosphonate, crystal water-free iron(II) metal pyrophosphate or crystal water-free iron(II) metal metaphosphate of the general formula $Fe_aMet_b(PO_c)_d$ described herein is $KFePO_4$, $K(Fe_{0.75}Zn_{0.25})PO_4$ or $K(Fe_{0.75}Mg_{0.25})PO_4$.

The one or more IR absorbing materials described herein are independently characterized by having a specific size. Herein the term "size" denotes a statistical property of the said IR absorbing materials. As known in the art, each of said one or more IR absorbing materials can be independently characterized by measuring a particle size distribution (PSD) of a sample. Such PSDs typically describe the fractional amount (relative to total number, weight or volume) of particles in the sample as a function of a size-related characteristic of individual particles. A commonly used size-related characteristic describing individual particles is the "circle equivalent" (CE) diameter, which corresponds to the diameter of a circle that would have the same area as an orthographic projection of the material. In this application, the following values are reported:

d(v,50) (hereafter abbreviated as d50 is the value of the CE diameter, in microns, which separates the PSD in two parts of equal cumulated volume: the lower part represent 50% of the cumulated volume of all particles, corresponding to those particles with a CE diameter smaller than d50; the upper part represents 50% of the cumulated volume of particles, corresponding to those particles with a CE diameter larger than d50. D50 is also known as the median of the volume distribution of particles, d(v,90) (hereafter abbreviated as d90 is the value of the CE diameter, in microns, which separates the PSD into two parts with different cumulated volumes such that the lower part represents 90% of the cumulated volume of all particles, corresponding to those particles with a CE diameter smaller than d90, and the upper part represents 10% of the cumulated volume of particles, with a CE diameter larger than d90, and similarly d(v,10) (hereafter abbreviated as d10 is the value of the CE diameter, in microns, which separates the PSD into two parts with different cumulated volumes such that the lower part represents 10% of the cumulated volume of all particles, corresponding to those particles with a CE diameter smaller than d10, and the upper part represents 90% of the cumulated volume of particles with a CE diameter larger than d10.

Each of the one or more IR absorbing materials described herein preferably has an average particle size (d50 value) from about 0.01 μm to about 50 μm, more preferably from about 0.1 μm to about 20 μm and still more preferably from about 1 μm to about and 10 μm.

A variety of experimental methods are available to measure PSDs including without limitation sieve analysis, electrical conductivity measurements (using a Coulter counter), laser diffractometry (e.g. Malvern Mastersizer), acoustic spectroscopy (e.g. Quantachrome DT-100), differential sedimentation analysis (e.g CPS devices), and direct optical granulometry. Laser diffractometry was used to determine PSDs cited in this application (instrument: (Cilas 1090); sample preparation: the IR absorbing material was added to distilled water or ethyl acetate, depending on the water solubility of the material to measure, until the laser obscuration reached the operating level of 13-15%, according to the ISO norm 13320.

The IR absorbing materials described herein are preferably produced by a method comprising the followings steps:
a) manufacture of a mixture containing:
  i) iron compounds (A) selected from Fe(III) compounds, Fe(III)/Fe(II) compounds and mixtures of these in a percentage of about 20 wt-% to about 90 wt-% by weight of the mixture selected from the group consisting of oxides, hydroxides, oxide hydroxides, carbonates, carboxylates such as oxalates, formates, acetates, citrates, lactates, orthophosphates, phosphonates, metaphosphonates, pyrophosphates, sulfates and mixtures of those mentioned above,
  ii) reduction agents (B) in a percentage of about 5 wt-% to about 50 wt-% by weight of the mixture selected from the group consisting of phosphonic acid $[H_3PO_3]$, phosphorus trioxide $[P_2O_3]$, phosphinic acid $[H_3PO_2]$, phosphorus tetroxide $[P_2O_4]$, hypodiphosphoric acid $[H_4P_2O_6]$, diphosphoric acid $[H_4P_2O_5]$, hypodiphosphonic acid $[H_4P_2O_4]$, Fe salts and Met salts of the above mentioned acids and mixtures of the above as solids, aqueous solutions or suspensions,
  iii) optional phosphate donor (C) in a percentage of about 0 wt-% to about 50 wt-% by weight of the mixture selected from phosphoric acid $[H_3PO_4]$ as an aqueous solution, metal phosphate $[Met_x(PO_4)_z]$ or acid metal phosphate $[MetH_y(PO_4)_z]$ with $1 \geq x \geq 4$, $1 \geq y \geq 5$ and $1 \geq z \geq 4$ as a solid or aqueous solutions or suspension, diphosphoric acid $[H_4P_2O_7]$, metaphosphoric acid $[(HPO_3)_n]$ with $n \geq 3$ or their salts, phosphorus pentoxide $[P_2O_5]$ or mixtures of the above, where Met is defined as above, and
  iv) optional metal (M) donor (D) in a percentage of about 0 wt-% to about 50 wt-% by weight of the mixture selected from metal compounds of one or more metals from the group consisting of K, Rb, Cs, Mg, Ca, Sr, Ba, the transition metals (d block), in particular Sc, Y, La, Ti, Zr, Hf, Nb, Ta, Cr, Mo, W, Mn, Cu, Zn, and the metals and semimetals of the third, fourth and fifth main group, in particular B, Al, Ga, In, Si, Sn, Sb, Bi, and the lanthanoids, and selected from the oxides, hydroxides, oxide hydroxides, carbonates, oxalates, formates, acetates, citrates, lactates, orthophosphates, pyrophosphates and sulfates of the above mentioned metals and mixtures of these,
  whereby the share of the weight of components (A) to (D) of the mixture is based on the percentage of the substances not including any solvent and/or suspension agent,
b) the mixture obtained, where it contains aqueous and/or organic solvents, is dried at a temperature of less than about 400° C., and
c) the dry or dried mixture is treated at a temperature between about 400 and about 1200° C.

The manufacture of the mixture of the iron compound (A) and the reduction agent (B) and optional phosphate donor (C) and metal (M) donor (D) in step a) of the method described herein can be achieved by means of the dissolving, suspending and/or mixing of the components in an aqueous or organic solvent or without an additional solvent.

The share of the weight of components (A) to (D) of the mixture indicated here is based on the percentage of the substances not including any solvent and/or suspension agent. For example, where phosphoric acid [$H_3PO_4$] is introduced as a phosphate donor (C) and used as an aqueous solution, the share of the weight of the $H_3PO_4$ will be indicated not including the water introduced as a solvent.

The solvent and/or suspending agent can be present in a ratio between 10 and 0.1 in relation to the total mass of the mixture not including the solvent and/or suspension agent. A weight ratio between 8 and 1 is preferred, and a weight between 4 and 1 is more preferred. A high percentage of solvent and/or suspending agent can simplify the processing of the mixture while a low percentage of solvent and/or suspension agent shortens the subsequent drying step accordingly.

When the mixture of step a) is a solution or a suspension, its manufacture takes place in the temperature between about 10° C. or room temperature and the boiling point of the solution or suspension, preferably at a temperature lower than about 150° C., more preferably between about 20° C. and about 100° C. is preferred, and still more preferably between about 40° C. and about 90° C. Furthermore, the manufacture of the solution or suspension described herein can be carried out at temperatures above the boiling point of the liquid using a closed container at the autogenous pressure of the solvent at the corresponding temperature.

A polar solvent is preferably used to manufacture the mixture in step a), in particular a solvent with a low level of viscosity and/or with a low boiling point, as this results in the subsequent drying step being simplified and accelerated considerably, in particular when the spray drying procedure is used. Suitable example of polar solvent include without limitation water, alcohols and polyols of a low chain length, ammoniac and mixtures thereof, wherein water is particularly preferred.

Preferably, the Fe(III) and/or Fe(III)/Fe(II) compounds used as iron compounds (A) in step a) are selected from the group consisting of oxides, hydroxides, oxide hydroxides, orthophosphates, pyrophosphates, metaphosphates and sulfates. These have the advantage that the anion is stable in terms of decomposition and/or redox reactions during the mixing and drying process. The use of the anions advantageously do not release any undesirable by-products during the redox processes which occur during temperature treatment of step c). This means that a product with more uniform particle size distribution and porosity can be obtained. The use of Fe(III) and/or Fe(III)/Fe(II) orthophosphates, pyrophosphates and metaphosphates has the further advantage that they also provide phosphate ions containing phosphorous in oxidation stage (V) for the formation of the product. The amount of the iron compound (A) in the mixture of step a) is between about 20 wt-% and about 90 wt-%, preferably between about 25 wt-% and about 85 wt-%, more preferably between about 30 wt-% and about 75 wt-%, the weight percent being based on the on the total weight of all components i) to iv) not including any solvent or suspension agent.

Preferably, the reduction agent (B) in step a) ii) is selected from the group consisting of phosphonic acid, phosphinic acid, hypodiphosphoric acid, diphosphonic acid and hypodiphosphonic acid and mixtures thereof. Alternatively or as a supplementary measure, the acid anhydrides phosphorus trioxide, phosphorus tetroxide or a mixture thereof can be used as reduction agent (B) of step b). The use of an anhydride has the advantage that the drying step b) carried out after stage a) can be carried out comparatively quickly due to the low water content of the anhydride.

The amount of the reduction agent (B) in the mixture manufactured in step a) is between about 5 wt-% and about 50 wt-%, preferably between about 7.5 wt-% and about 40 wt-%, more preferably between about 10 wt % and about 30 wt-%, the weight percent being based on the total weight of all components i) to iv) not including any solvent or suspension agent.

As described herein, the mixture of step a) may further comprise the phosphate donor (C) described herein which brings phosphate ions with phosphorous into the mixture in oxidation stage (V). It is advantageous to add the additional phosphate donor (C) in such a quantity that the phosphate ions generated from the reduction agent (B) during the temperature treatment stage c) and the phosphate ions introduced by the phosphate donor (C) are present in a molar quantity in relation to the Fe ions, and where applicable the metal (M) ions, that sufficient phosphate ions are provided for the formation of the product. The use of aqueous, strongly acidic solutions of phosphoric acid as phosphate donors is advantageous due to the good availability, the simple dosing and the very low price. The use of the corresponding acid anhydride $P_2O_5$ is linked to the advantage that the drying step which is carried out after the mixing can be carried out significantly more quickly due to the low water content. The amount of the phosphate donor (C) in the mixture of step a) is between about 0 wt-% and about 50 wt-%, preferably between about 0 wt-% and about 40 wt-%, more preferably between about 0 wt % and about 30 wt-%, the weight percent being based on the total weight of all components i) to iv) not including any solvent or suspension agent.

As described herein, the mixture of step a) may further comprise the additional metal donor (D) described herein. In the manufacture method for producing the crystal water-free mixed metallic iron(II) metal compounds of the general formula $Fe_aMet_b(PO_c)_d$, this metal donor (D) provides "Met" in addition to metal components containing iron where these have not been provided to a sufficient extent by means of the phosphate donor. The metal donor (D) is selected from the group consisting of oxides, hydroxides, oxide hydroxides, carbonates, oxalates, formates, acetates, citrates, lactates, orthophosphates, pyrophosphates, sulfates and mixtures thereof. The use of hydroxides, oxide hydroxides, carbonates, oxalates, formates, acetates, citrates and/or lactates has the advantage that no residues of the anion remain in the product from these compounds as impurities after the temperature treatment in step c). The use of orthophosphates and pyrophosphates has the advantage that phosphate ions are simultaneously provided for the formation of the end product. The amount of the metal donor (D) in the mixture of step a) is between about 0 wt-% and about 50 wt-%, preferably between about 0 wt-% and about 40 wt-%, more preferably between about 0 wt % and about 30 wt-%, the weight percent being based on the total weight of all components i) to iv) not including any solvent or suspension agent.

The mixture manufactured in step a) of the method described herein is then dried at a temperature of less than about 400° C. in the subsequent step b) if it contains aqueous and/or organic solvents, wherein a temperature of less than 400° C. refers to the temperature of the mixture to be dried in the drying process. In this context, drying means that water and/or other solvents are removed from the mixture to the extent that the water and/or other solvent content is less than about 5 wt-%, preferably less than about 3 wt-%, and more preferably less than about 0.8 wt-%, the weight percent being based on the total mass of the mixture. The degree of drying may be determined by thermogravimetry (TGA).

The drying of the mixture in step b) may be carried out using any suitable drying process including without limitation freeze drying, supercritical drying, microwave drying, vacuum drying, convective drying such as convective air drying or convective drying in an inert gas atmosphere, spray drying, spray granulation or drying in a rotary kiln. Preferably, the drying of the mixture in step b) include convective drying in an inert gas atmosphere and spray drying or spray granulation as these keep the tendency of the product to oxidize low. Spray drying is even more preferable as this is highly energy efficient and provides a product with even particle size distribution. In the case of drying using convective methods, for example in a rotary kiln, the temperature of the drying gas can be up to 600° C. if the drying is carried out in an inert gas atmosphere. If this is the case, the temperature of the mixture to be dried may not exceed 400° C. If the convective drying is not carried out in an inert gas atmosphere, the temperature of the drying gas does not exceed 400° C., preferably does not exceed 300° C., more preferably does not exceed 250° C. in order to decrease the oxidation of the reduction agent in the mixture with oxygen.

According to one embodiment, the drying of the mixture in step b) is carried out by means of the vaporization of the solution or suspension manufactured described herein in a hot gas flow in a spray dryer. Hot gas and the product flow are guided in continuous flow or counter flow and the vaporization is achieved using at least one pressure nozzle, a single-substance nozzle or a two-substance nozzle or at least one rotation vaporizer or combinations of these. Drying in a continuous current procedure is particularly preferred. Heated air, air containing burner exhaust gas, oxygen-reduced air enriched with nitrogen or inert gases, and nitrogen can preferably serve as a hot gas flow. The use of heated air and air containing burner exhaust gases is particularly preferable. The heating of the hot gas flow is preferably carried out by means of at least one burner, hot gas generator, electric gas heater or steam heat exchangers or combinations thereof. The use of at least one two-substance nozzle or a rotation vaporizer is particularly preferred during vaporization. Particularly preferably, the vaporization is carried out in a two-substance nozzle using compressed air, nitrogen or hot steam at a pressure between about 1.0 and about 6.0 bar. More preferably, compressed air in the pressure range between about 1.5 and about 3.0 bar is used. The separation of the dried product flow from the process gas flow is preferably achieved using at least one cyclone or at least one filter or any combinations of these.

According to another embodiment, the drying of the mixture in step b) is carried out by means of the vaporization of the solution or suspension manufactured described herein on a fluidized bed in a hot gas flow made of already dried goods in a spray granulator with at least one granulation zone. The vaporization of the solution or suspension according to the invention is achieved using at least one nozzle, a single-substance nozzle, a two-substance nozzle, a multiple-substance nozzle or a combination of these. The manufacturing can be in batches or continuously. The vaporization is preferably carried out in a two-substance nozzle using compressed air, nitrogen or hot steam at a pressure between about 1.0 and about 6.0 bar. More preferably, compressed air in the pressure range between about 1.5 and about 3.0 bar is used.

According to a preferred embodiment, the spray granulation is carried out with a granulation zone in continuous operation by means of the continuous spraying-on of the solution or suspension and the continuous removal of dried granulate from the fluidized bed. Heated air, heated air containing burner exhaust gas, heated oxygen-reduced air enriched with nitrogen or inert gases, and heated nitrogen are suitable as hot gas flows. The use of heated air and heated air containing burner exhaust gases is particularly preferable.

In a further preferred embodiment, the drying of the mixture in step b) is carried out continuously in a spray granulator with several fluidized zones, particularly preferably 2 to 5 zones. In a particularly preferred variant, the final fluidized zone is used to cool the product and is fluidized and held without the spraying-on of the solution or suspension according to the invention with cool gas.

In the spray granulation method, the necessary fluidized layer in the spray granulator is advantageously continuously generated by abrasion and spray drying and provided by means of filters or filter return in the device. In a particularly preferred embodiment, the granulation system also has a sieving and grinding cycle from which on the one hand the dry product is separated from particles which are too coarse and those which are too fine by means of sieving, and the coarse and fine fractions are added back to the spray granulator as a fluidizing layer by means of grinding. The hot has generation for the spray granulation occurs in the same way as the hot gas generation in spray drying.

The dried mixture manufactured in step b) of the method described herein is then subjected to a temperature treatment (calcination) at a temperature between about 400° C. and about 1200° C., preferably between about 500° C. and about 1100° C., and more preferably between about 600° C. and about 1000° C. The temperature should be selected to be high enough that a melting of all of the substances involved in the reaction is ensured. In the temperature treatment in step c), inter alia the Fe(III) ions brought into the mixture by the iron compound (A) should be reduced to Fe(II) ions.

The temperature treatment of the dried mixture manufactured in step b) is carried out in batches or continuously in an inert or reducing atmosphere, preferably nitrogen, inert gas, forming gas with a maximum concentration of 5% by volume $H_2$ or combinations of these. The percentage by volume of oxygen in the process gas is ideally between about 0.0% and about 1.0% by volume, preferably less than about 0.3% by volume, and more preferably less than about 0.03% by volume. The use of the forming gas is particularly preferably "95/5", in other words 95% by volume nitrogen (N2) and 5% by volume hydrogen ($H_2$).

In a preferred embodiment, the temperature treatment in step c) is carried out as continuous operation in a controlled atmosphere, whereby the process gas atmosphere is guided in a continuous flow with the product or in counter flow to the product.

In a further preferred variant, the dried mixture manufactured in step b) are subsequently treated with thermal treatment with counter flowing process gases in a rotary kiln with a cooling zone connected. The process gas is introduced on the cool zone side and flows over the cooling product in order to prevent oxidation. The use of indirectly heated rotating drums with at least one heated zone but preferably two to eight heating zones which can be independently regulated is particularly preferred. Indirect heating can occur in very many varied ways, including without limitation electrical resistance heating (heating elements, heating coils), with gas burners, with oil burners, or through induction; electrical resistance heating and gas burners being preferred.

In a further preferred embodiment, the rotating drum has fittings inside in the shape of lifting paddles, preferably two to six lifting paddles extending in a radial direction, which improve the mixing of the solids with the gas phase and promote the transfer of heat on the wall side. Furthermore, lifting paddles or fittings with axial conveyor components which are suitable to shorten the residence time in the rotating drum are advantageous. Suitable rotating drums have gas-flushed seals which are applied in an inert gas atmosphere or reduced atmosphere in order to prevent the penetration of oxygen. Atmospheric separation is advantageously carried out by means of double shuttle valves, rotary valves and/or rinsed screws. Covering the product in question with a layer of inert or reducing atmosphere on minimizes the entry of oxygen into the kiln.

In a preferred embodiment, the temperature treatment in stage c) is carried out in a rotary kiln. This enables a continuous temperature treatment procedure to be carried out which is therefore generally more cost-effective than a batch procedure. The use of an indirectly heated rotary kiln is particularly preferred as this enables the precise control of the atmosphere in the product area.

The temperature treatment in stage c) may be advantageously carried out in an inert gas atmosphere, in other words the atmosphere is made up of a gas or a gas mixture such as for example N2 and/or noble gases which does not react with the components of the mixture in the relevant temperature range.

In a preferred embodiment of the method described herein, the temperature treatment in stage c) is carried out in a reducing gas atmosphere. In this context, a reducing gas atmosphere means that this contains a least one reducing gas component which is suitable to reduce components of the treated mixture, in particular to reduce the Fe(III) ions introduced to the mixture by the iron compound (A) to Fe(II) ions. Suitable reducing gas components are CO and $H_2$. The use of forming gas containing 5% by volume $H_2$ in N2 is particularly preferable as this is neither flammable nor toxic.

Carrying out the majority of the reduction of the Fe(III) ions to Fe(II) ions using the reduction agent (B) and the remainder of the reduction using a reduction gas atmosphere is particularly preferable according to the invention. This can suppress both the formation of free carbon and the formation of metal phosphides.

In a preferred embodiment of the method described herein, the mixture manufactured in step a) contains Fe(III) ions in a molecular ratio to the reduction agents (B), which based on the stoichiometry and assuming 100% conversion would provide a reduction of 70% to 99%, preferably 80% to 98%, particularly preferably 90% to 95% of the Fe(III) ions to Fe(II) ions through the reduction agent (B). Where high percentages of reduction agents are required from a stoichiometric perspective, there is a risk of the formation of metal phosphides and/or elemental metals which make the product impure and can dye it a dark color. Using the example of phosphonic acid [$H_3PO_3$] as a reduction agent with phosphorous in oxidation stage (III), this would correspond to a stoichiometric ratio of P(III) atoms in the reduction agent to Fe(III) ions of 0.35:1 to 0.495:1 with an assumed reduction of 70% to 99%.

The security inks described herein are oxidative drying security inks, UV-Vis curable security inks, thermal drying security inks, or combinations thereof.

The security inks described herein are particularly suitable to be applied by a printing process selected form the group consisting of offset printing processes, intaglio printing processes, screen printing processes, rotogravure processes, flexography processes and flextensional inkjet printing processes onto a substrate such as those described herein, preferably selected form the group consisting of intaglio printing processes, screen printing processes, rotogravure processes, flexography processes and flextensional inkjet printing processes and more preferably selected form the group consisting of intaglio printing processes, screen printing processes and rotogravure processes.

Oxidative drying security inks dry by oxidation in the presence of oxygen, in particular in the presence of the oxygen of the atmosphere. During the drying process, the oxygen combines with one or more components of the ink, converting the ink to a solid state. The process may be accelerated by the use of driers (also referred in the art as catalysts, siccative agents, desiccatives or dessicators) such as for example inorganic or organic salts of metal(s), metallic soaps of organic acids, metal complexes and metal complex salts optionally with the application of a thermal treatment. The one or more driers used in the oxidative drying security ink described herein are preferably present in an amount from about 0.01 to about 10 wt-%, more preferably in an amount from about 0.1 to about 5 wt-%, the weight percents being based on the total weight of the oxidative drying security ink. Preferably the one or more driers are polyvalent salts containing cobalt, calcium, copper, zinc, iron, zirconium, manganese, barium, zinc, strontium, lithium, vanadium and potassium as the cation(s); and halides, nitrates, sulfates, carboxylates like acetates, ethylhexanoates, octanoates and naphtenates or acetoacetonates as the anion(s). More preferably, the one or more driers are selected from the group consisting of ethylhexanoates or octanoates of manganese, cobalt, calcium, strontium, zirconium, zinc and mixtures thereof.

As generally known in the art, oxidative drying security inks comprise one or more varnishes. The term "varnish" is also referred in the art as resin, binder or ink vehicle. The drying varnishes described herein are preferably present in the oxidative drying security inks described herein in an amount from about 10 to about 90 wt-%, the weight percents being based on the total weight of the oxidative drying security inks. The one or more varnishes for the oxidative drying security inks described herein are preferably selected form the group consisting of polymers comprising unsaturated fatty acid residues, saturated fatty acids residues and mixtures thereof, as generally known in the art. Preferably the one or more varnishes oxidative drying security inks described herein comprise unsaturated fatty acid residues to ensure the air drying properties. Particularly preferred oxidative drying varnishes are resins comprising unsaturated acid groups, even more preferred are resins comprising unsaturated carboxylic acid groups. However the resins may also comprise saturated fatty acids residues. Preferably the varnishes oxidative drying security inks described herein comprise acid groups, i.e. the oxidative drying varnishes are selected among acid modified resins. The oxidative drying varnishes described herein may be selected from the group consisting of alkyd resins, vinyl polymers, polyurethane resins, hyperbranched resins, rosin-modified maleic resins, rosin-modified phenol resins, rosin ester, petroleum resin-modified rosin ester, petroleum resin-modified alkyd resin, alkyd resin-modified rosin/phenol resin, alkyd resin-modified rosin ester, acrylic-modified rosin/phenol resin, acrylic-modified rosin ester, urethane-modified rosin/phenol resin, urethane-modified rosin ester, urethane-modified alkyd resin, epoxy-modified rosin/phenol resin, epoxy-modified alkyd resin, terpene resins nitrocellulose resins, polyolefins, polyamides, acrylic resins and combinations or mixtures thereof. Polymers and resins are herein interchangeably used.

Saturated and unsaturated fatty acid compounds may be obtained from natural and/or artificial sources. Natural sources include animal sources and/or plant sources. Animal sources may comprise animal fat, butter fat, fish oil, lard, liver fats, tuna fish oil, sperm whale oil and/or tallow oil and waxes. Plant sources may comprise waxes and/or oils such as vegetable oils and/or non-vegetable oils. Examples of plant oils include without limitation bitter gourd, borage, calendula, canola, castor, china wood, coconut, conifer seed, corn, cottonseed, dehydrated castor, flaxseed, grape seed, *Jacaranda mimosifolia* seed, linseed oil, palm, palm kernel, peanut, pomegranate seed, rapeseed, safflower, snake gourd, soya (bean), sunflower, tall, tung and wheat germ. Artificial sources include synthetic waxes (such as micro crystalline and/or paraffin wax), distilling tail oil and/or chemical or biochemical synthesis methods. Suitable fatty acids also include (Z)-hexadan-9-enoic[palmitoleic]acid ($C_{16}H_{30}O_2$), (Z)-octadecan-9-enoic[oleic]acid ($C_{18}H_{34}O_2$), (9Z, 11E, 13E)-octadeca-9,11, 13-trienoic[α-eleostearic]acid ($C_{18}H_{30}O_2$), licanic acid, (9Z,12Z)-octadeca-9,12-dienoic [linoeic]acid ($C_{18}H_{32}O_2$), (5Z, 8Z,11Z,14Z)-eicosa-5,8,11, 14-tetraenoic[arachidonic]acid ($C_{20}H_{32}O_2$), 12-hydroxy-(9Z)-octadeca-9-enoic[ricinoleic]acid ($C_{18}H_{34}O_3$), (Z)-docosan-13-enoic[erucic]acid ($C_{22}H_{42}O_3$), (Z)-eicosan-9-enoic[gadoleic]acid ($C_{20}H_{38}O_2$), (7Z, 10Z, 13Z, 16Z, 19Z)-docosa-7, 10, 13, 16, 19-pentaenoic[clupanodonic] acid and mixtures thereof.

Suitable fatty acids are ethylenically unsaturated conjugated or non-conjugated $C_2$-$C_{24}$ carboxylic acids, such as myristoleic, palmitoleic, arachidonic, erucic, gadoleic, clupanadonic, oleic, ricinoleic, linoleic, linolenic, licanic, nisinic acid and eleostearic acids or mixtures thereof. Those fatty acids are typically used in the form of mixtures of fatty acids derived from natural or synthetic oils.

The oxidatively drying security inks described herein may further comprise one or more antioxidants such as those known by people skilled in the art. Suitable antioxidants include without limitation alkyl phenols, hindered alkyl phenols, alkylthiomethyl-phenols, eugenol, secondary amines, thioether, phosphites, phosphonites, dithiocarbamates, gallates, malonates, propionates, acetates and other esters, carboxamides, hydroquinones, ascorbic acid, triazines, benzyl compounds as well as tocopherols and analogue terpenes. Such antioxidants are commercially available for example from the sources disclosed in WO 02/100 960. Hindered alkyl phenols are phenols having at least one or two alkyl groups ortho to the phenolic hydroxyl. One, preferably both, alkyl groups ortho to the phenolic hydroxyl are preferably secondary or tertiary alkyl, most preferred tertiary alkyl, especially tert-butyl, tert-amyl or 1,1,3,3-tetramethylbutyl. Preferred antioxidants are hindered alkyl phenols and especially, 2-tert-butyl-hydroquinone, 2,5-di-tert-butyl-hydroquinone, 2-tert-butyl-p-cresol and 2,6-di-tert-butyl-p-cresol. When present, the one or more antioxidants are present in an amount from about 0.05 to about 3 wt-%, the weight percents being based on the total weight of the oxidatively drying security ink.

The oxidatively drying security inks described herein may further comprise one or more waxes preferably selected from the group consisting of synthetic waxes, petroleum waxes and natural waxes. Preferably the one or more waxes are selected from the group consisting of microcrystalline waxes, paraffin waxes, polyethylene waxes, fluorocarbon waxes, polytetrafluoroethylene waxes, Fischer-Tropsch waxes, silicone fluids, beeswaxes, candelilla waxes, montan waxes, carnauba waxes and mixtures thereof. When present, the one or more waxes are preferably present in an amount from about 0.1 to about 15 wt-%, the weight percents being based on the total weight of the oxidatively drying security ink.

The oxidatively drying security inks described herein may further comprise one or more fillers and/or extenders preferably selected from the group consisting of carbon fibers, talcs, micas (e.g. muscovites), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulfides, wood flours, quartz flours, natural fibers, synthetic fibers and combinations thereof. When present, the one or more fillers or extenders are preferably present in an amount from about 0.1 to about 40 wt-%, the weight percents being based on the total weight of the oxidatively drying security ink.

According to an embodiment, the oxidatively drying security inks described herein are oxidative drying intaglio printing security inks, wherein said oxidative drying intaglio printing security inks comprise the one or more driers described herein, the one or more varnishes described herein and the optional additives or ingredients described herein.

According to an embodiment, the oxidatively drying security inks described herein are oxidative drying offset printing security inks, wherein said oxidative drying offset printing security inks comprise the one or more driers described herein, the one or more varnishes described herein and the optional additives or ingredients described herein.

The machine readable security features described herein may be prepared through an intaglio printing process (also referred in the art as engraved copper plate printing and engraved steel die printing), which is capable of depositing a sufficiently high amount of machine readable material on the substrate so as to allow for its detection and sensing. Intaglio printing processes refer to printing methods used in particular in the field of security documents. The intaglio printing process is known to be the most consistent and high quality printing process for producing fine tapering lines and is therefore the printing technology of choice for fine design in the field of security documents, in particular banknotes and stamps. In particular, one of the distinguishing features of the intaglio printing process is that the layer thickness of the ink transferred to the substrate may be varied from a few micrometers to several tens of micrometers by using correspondingly shallow or deep engravings on the intaglio printing device. As mentioned hereabove, the layer thickness of intaglio printed security features thus allow a sufficiently high amount of machine readable material on the substrate for its detection and sensing.

Oxidative drying offset printing security inks are known in the art as requiring a high viscosity. Typically, security inks suitable for oxidative drying offset printing processes have a viscosity in the range of about 2.5 to about 25 Pa s at 40° C. and 1000 $s^{-1}$; the viscosities being measured on a Haake Roto-Visco RV1 with a cone 2 cm 0.5°.

Oxidative drying intaglio printing security inks are known in the art as requiring a high viscosity. Typically, security inks suitable for oxidative drying intaglio printing processes have a viscosity in the range of about 3 to about 60 Pa s at 40° C. and 1000 s$^{-1}$ using a Haake Roto-Visco RV1, rotational rheometer using a cone plate of 20 mm diameter and a 0.5° geometry.

The oxidative drying intaglio printing security inks described herein may further comprise one or more surfactants, in particular hydrophilic macromolecular surfactants such as those described e.g. in EP 0 340 163 B1. The role of the optional surfactants is to help wiping off the excess of ink present on the printing cylinder just before contacting said printing cylinder with the substrate. This process of wiping off the excess of ink is part of any high-speed, industrial intaglio printing process and is carried out using a tissue or a paper roll ("calico"), or a polymer wiping cylinder and a cleansing water-based solution ("wiping solution"). In this case, the optional surfactants are used to emulsify the excess of ink in the cleansing solution. Said surfactants may be nonionic, anionic or cationic as well as zwitterionic ones. In the case of hydrophilic macromolecular surfactants, the functional groups are for example carboxylic or sulfonic acid groups, hydroxyl groups, ether groups or primary, secondary, tertiary or quaternary amino groups. The acid groups may be neutralized with amines, alcanolamines or preferably inorganic bases, or combinations thereof. Primary, secondary and tertiary amino groups may be neutralized with inorganic or organic acids such as sulfonic acids, formic acid, acetic acid, trifluoroacetic acid and others. Particularly preferred are anionic macromolecular surfactants (AMS), such as those described in EP 2 014 729 A1.

UV-Vis curable security inks consist of security inks that may be cured UV-visible light radiation. The UV-Vis curable security inks described herein comprise from about 0.1 wt-% to about 20 wt-% of one or more photoinitiators and preferably about 1 wt-% to about 15 wt-%, the weight percents being based on the total weight of the UV-Vis curable security ink.

Preferably, the UV-Vis curable security inks described herein comprise one or more UV curable compounds being monomers and oligomers selected from the group consisting of radically curable compounds and cationically curable compounds. The security inks described herein comprise described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the security ink. Radically curable compounds are cured by free radical mechanisms typically including the activation by radiation of one or more photoinitiators, thereby generating radicals which in turn initiate the polymerization so as to cure the security ink.

Preferably, the UV-Vis curable security ink described herein comprises one or more oligomers (also referred in the art as prepolymers) selected from the group consisting of oligomeric (meth)acrylates, vinyl ethers, propenyl ethers, cyclic ethers such as epoxides, oxetanes, tetrahydrofuranes, lactones, cyclic thioethers, vinyl and propenyl thioethers, hydroxyl-containing compounds and mixtures thereof. More preferably, the binder of the UV-Vis curable security ink described herein is prepared from oligomers selected from the group consisting of oligomeric (meth)acrylates, vinyl ethers, propenyl ethers, cyclic ethers such as epoxides, oxetanes, tetrahydrofuranes, lactones and mixtures thereof. Typical examples of epoxides include without limitation glycidyl ethers, β-methyl glycidyl ethers of aliphatic or cycloaliphatic diols or polyols, glycidyl ethers of diphenols and polyphenols, glycidyl esters of polyhydric phenols, 1,4-butanediol diglycidyl ethers of phenolformalhedhyde novolak, resorcinol diglycidyl ethers, alkyl glycidyl ethers, glycidyl ethers comprising copolymers of acrylic esters (e.g. styrene-glycidyl methacrylate or methyl methacrylate-glycidyl acrylate), polyfunctional liquid and solid novolak glycidyl ethers resins, polyglycidyl ethers and poly(β-methylglycidyl) ethers, poly(N-glycidyl) compounds, poly(S-glycidyl) compounds, epoxy resins in which the glycidyl groups or β-methyl glycidyl groups are bonded to hetero atoms of different types, glycidyl esters of carboxylic acids and polycarboxylic acids, limonene monoxide, epoxidized soybean oil, bisphenol-A and bisphenol-F epoxy resins. Examples of suitable epoxides are disclosed in EP 2 125 713 B1. Suitable examples of aromatic, aliphatic or cycloaliphatic vinyl ethers include without limitation compounds having at least one, preferably at least two, vinyl ether groups in the molecule. Examples of vinyl ethers include without limitation triethylene glycol divinyl ether, 1,4-cyclohexanedimethanol divinyl ether, 4-hydroxybutyl vinyl ether, propenyl ether of propylene carbonate, dodecyl vinyl ether, tert-butyl vinyl ether, tert-amyl vinyl ether, cyclohexyl vinyl ether, 2-ethylhexyl vinyl ether, ethylene glycol monovinyl ether, butanediol monovinyl ether, hexanediol monovinyl ether, 1,4-cyclohexanedimethanol monovinyl ether, diethylene glycol monovinyl ether, ethylene glycol divinyl ether, ethylene glycol butylvinyl ether, butane-1,4-diol divinyl ether, hexanediol divinyl ether, diethylene glycol divinyl ether, triethylene glycol divinyl ether, triethylene glycol methylvinyl ether, tetraethylene glycol divinyl ether, pluriol-E-200 divinyl ether, polytetrahydrofuran divinyl ether-290, trimethylolpropane trivinyl ether, dipropylene glycol divinyl ether, octadecyl vinyl ether, (4-cyclohexyl-methyleneoxyethene)-glutaric acid methyl ester and (4-butoxyethene)-iso-phthalic acid ester. Examples of hydroxy-containing compounds include without limitation polyester polyols such as for example polycaprolactones or polyester adipate polyols, glycols and polyether polyols, castor oil, hydroxyfunctional vinyl and acrylic resins, cellulose esters, such as cellulose acetate butyrate, and phenoxy resins. Further examples of suitable cationically curable compounds are disclosed in EP 2 125 713 B1 and EP 0 119 425 B1.

According to one embodiment of the present invention, the UV-Vis curable security inks described herein comprise one or more radically curable oligomeric compounds selected from (meth)acrylates, preferably selected from the group consisting of epoxy (meth)acrylates, (meth)acrylated oils, polyester (meth)acrylates, aliphatic or aromatic urethane (meth)acrylates, silicone (meth)acrylates, amino (meth)acrylates, acrylic (meth)acrylates and mixtures thereof. The term "(meth)acrylate" in the context of the present invention refers to the acrylate as well as the corresponding methacrylate. The components of the UV-Vis curable security inks described herein comprise may be prepared with additional vinyl ethers and/or monomeric acrylates such as for example trimethylolpropane triacrylate (TMPTA), pentaerytritol triacrylate (PTA), tripropyleneglycoldiacrylate (TPGDA), dipropyleneglycoldiacrylate (DPGDA), hexanediol diacrylate (HDDA) and their polyethoxylated equivalents such as for example polyethoxylated trimethylolpropane triacrylate, polyethoxylated pentaerythritol triacrylate, polyethoxylated tripropyleneglycol diacrylate, polyethoxylated dipropyleneglycol diacrylate and polyethoxylated hexanediol diacrylate.

Alternatively, the UV-Vis curable security ink described herein is a hybrid ink and may be prepared from a mixture of radically curable compounds and cationically curable compounds such as those described herein.

As mentioned above, UV-Vis curing of a monomer, oligomer requires the presence of one or more photoinitiators and may be effected in a number of ways. As mentioned herein and as known by the man skilled in the art, the UV-Vis curable security ink described herein to be cured and hardened on a substrate comprise such as those described herein one or more photoinitiators optionally with one or more photosensitizers, said one or more photoinitiators and optional one or more photosensitizers being selected according to its/their absorption spectrum/spectra in correlation with the emission spectrum of the radiation source. Depending on the degree of transmission of the electromagnetic radiation through the substrate, hardening of the security ink may be obtained by increasing the irradiation time. However, depending on the substrate material, the irradiation time is limited by the substrate material and its sensitivity to the heat produced by the radiation source.

Depending on the monomers, oligomers or prepolymers used in the UV-Vis curable security ink described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulfonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof.

The UV-Vis curable security ink described herein is preferably a UV-Vis curable offset printing security ink, a UV-Vis curable intaglio printing security ink, a UV-Vis curable screen printing security ink, a UV-Vis curable flexography printing security ink, a UV-Vis curable rotogravure printing security ink or a UV-Vis curable flextensional inkjet printing security ink, more preferably a UV-Vis curable intaglio printing security ink, a UV-Vis curable screen printing security ink, a UV-Vis curable flexography printing security ink, a UV-Vis curable rotogravure printing security ink or a UV-Vis curable flextensional inkjet printing security ink.

According to an embodiment, the UV-Vis curable security inks described herein are UV-Vis curable offset printing security inks, wherein said UV-Vis curable offset printing security inks comprise the one or more photoinitiators described herein, the one or more UV curable compounds being monomers and oligomers described herein and the optional additives or ingredients described herein.

According to an embodiment, the UV-Vis curable security inks described herein are UV-Vis curable intaglio printing security inks, wherein said UV-Vis curable intaglio printing security inks comprise the one or more photoinitiators described herein, the one or more UV curable compounds being monomers and oligomers described herein and the optional additives or ingredients described herein.

UV-Vis curable offset printing security inks are known in the art as requiring a high viscosity. Typically, security inks suitable for UV-Vis curable printing processes have a viscosity in the range of about 2.5 to about 25 Pa s at 40° C. and 1000 $s^{-1}$; the viscosities being measured on a Haake Roto-Visco RV1 with a cone 2 cm 0.5°.

UV-Vis curable intaglio printing security inks are known in the art as requiring a high viscosity. Typically, security inks suitable for intaglio printing processes typically have a viscosity in the range of about 3 to about 60 Pa s at 40° C. and 1000 $s^{-1}$ using a Haake Roto-Visco RV1, rotational rheometer using a cone plate of 20 mm diameter and a 0.5° geometry.

According to an embodiment, the UV-Vis curable security inks described herein are UV-Vis curable screen printing security inks, wherein said UV-Vis curable screen printing security inks comprise the one or more photoinitiators described herein, the one or more UV curable compounds being monomers and oligomers described herein and the optional additives or ingredients described herein.

Screen printing (also referred in the art as silkscreen printing) is a stencil process whereby an ink is transferred to a surface through a stencil supported by a fine fabric mesh of silk, synthetic fibers or metal threads stretched tightly on a frame. The pores of the mesh are block-up in the non-image areas and left open in the image area, the image carrier being called the screen. Screen printing might be flat-bed or rotary. During printing, the frame is supplied with the ink which is flooded over the screen and a squeegee is then drawn across it, thus forcing the ink through the open pores of the screen. At the same time, the surface to be printed is held in contact with the screen and the ink is transferred to it. Screen printing is further described for example in *The Printing ink manual*, R.H. Leach and R.J. Pierce, Springer Edition, $5^{th}$ Edition, pages 58-62 and in *Printing Technology*, J. M. Adams and P.A. Dolin, Delmar Thomson Learning, $5^{th}$ Edition, pages 293-328.

UV-Vis curable screen printing security inks are known in the art as requiring a low viscosity. Typically, security inks suitable for screen printing processes have a viscosity in the range of about 0.05 to about 5 Pa s at 25° C. using a Brookfield machine (model "DV-I Prime", small sample adapter, spindle SC4-21 at 50 rpm).

According to an embodiment, the UV-Vis curable security inks described herein are UV-Vis curable flexography printing security inks, wherein said wherein UV-Vis curable flexography printing security inks comprise the one or more photoinitiators described herein, the one or more UV curable compounds being monomers and oligomers described herein and the optional additives or ingredients described herein.

Flexography printing methods preferably use a unit with a chambered doctor blade, an anilox roller and plate cylinder. The anilox roller advantageously has small cells whose volume and/or density determines the protective varnish application rate. The chambered doctor blade lies against the anilox roller, filling the cells and scraping off surplus protective varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in *Printing Technology*, J. M. Adams and P.A. Dolin, Delmar Thomson Learning, 5$^{th}$ Edition, pages 359-360.

UV-Vis curable flexography printing security inks are known in the art as requiring a low viscosity. Typically, security inks suitable for flexography processes have a viscosity in the range of about 0.01 to about 1 Pa s at 25° C. and 1000 s$^{-1}$ using a rotational viscosimeter DHR-2 from TA Instruments (cone-plane geometry, diameter 40 mm).

According to an embodiment, the UV-Vis curable security inks described herein are UV-Vis curable rotogravure printing security inks, wherein said UV-Vis curable rotogravure printing security inks comprise the one or more photoinitiators described herein, the one or more UV curable compounds being monomers and oligomers described herein and the optional additives or ingredients described herein.

As known by those skilled in the art, the term rotogravure refers to a printing process which is described for example in "Handbook of print media", Helmut Kipphan, Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

UV-Vis curable rotogravure printing security inks are known in the art as having a low viscosity. Typically, security inks suitable for rotogravure printing processes have a viscosity in the range of about 0.01 to about 0.5 Pa s at 25° C. and 1000 s$^{-1}$ using a rotational viscosimeter DHR-2 from TA Instruments (cone-plane geometry, diameter 40 mm).

According to an embodiment, the UV-Vis curable security inks described herein are UV-Vis curable flextensional inkjet printing security inks, wherein said UV-Vis curable flextensional inkjet printing security inks comprise the one or more photoinitiators described herein, the one or more UV curable compounds being monomers and oligomers described herein and the optional additives or ingredients described herein.

Flextensional inkjet printing is an inkjet printing using a flextensional inkjet print head structure. Usually, flextensional transducers include a body or substrate, a flexible membrane having an orifice defined therein, and an actuator. The substrate defines a reservoir for holding a supply of flowable material and the flexible membrane has a circumferential edge supported by the substrate. The actuator may either be piezoelectric (i.e. it includes a piezoelectric material which deforms when an electrical voltage is applied), or thermally activated, such as described for example in U.S. Pat. No. 8,226,213. As such, when the material of the actuator deforms, the flexible membrane deflects causing a quantity of flowable material to be ejected from the reservoir through the orifice. Flextensional print head structures are described in U.S. Pat. No. 5,828,394, wherein a fluid ejector is disclosed which includes one wall including a thin elastic membrane having an orifice defining a nozzle and elements responsive to electrical signals for deflecting the membrane to eject drops of fluid from the nozzle. Flextensional print head structures are described in U.S. Pat. No. 6,394,363, wherein the disclosed uses for example excitation of the surface layers incorporating nozzles which are arranged over one surface layer with addressability, forming a liquid projection array, capable of operation at high frequencies with a wide range of liquids. Flextensional print head structures are also described in U.S. Pat. No. 9,517,622, which describes a liquid droplet forming apparatus comprising a film member configured to be vibrated so as to eject liquid held in a liquid holding unit, wherein a nozzle is formed in the film member. Further it is provided a vibrating unit to vibrate the film member; and a driving unit to selectively apply an ejection waveform and a stirring waveform to the vibrating unit. Flextensional print head structures are also described in U.S. Pat. No. 8,226,213 which describes a method of actuating a thermal bend actuator having an active beam fused to a passive beam. The method comprises passing an electrical current through the active beam so as to cause thermoelastic expansion of the active beam relative to the passive beam and bending of the actuator.

UV-Vis curable flextensional inkjet printing security inks are known in the art as having a very low viscosity. Typically, security inks suitable for flextensional inkjet printing processes have a viscosity less than about 100 mPas, when measured at 25° C. and 1000 s$^{-1}$ using a rotational viscosimeter DHR-2 from TA Instruments, having a cone-plane geometry and a diameter of 40 mm.

Thermal drying security inks consist of security inks which are dried by hot air, infrared or by a combination thereof. Thermal drying security inks typically consist of about 10 wt-% to about 90 wt-% solid content that remains on the printed substrate and about 10 wt-% to about 90 wt-% of one or more solvents which are evaporated as a result of drying, the one or more solvents being selected from the group consisting of organic solvents, water and mixtures thereof.

Preferably, the organic solvents described herein are selected from the group consisting of alcohols (such as ethanol), ketones (such as methyl ethyl ketone), esters (such as ethyl acetate or propyl acetate), glycol ethers (such as DOWANOL DPM), glycol ether esters (such as butyl glycol acetate) and mixtures thereof.

According to one embodiment, the thermal drying security inks described herein consist of water-based thermal drying security inks comprising one or more resins selected from the group consisting of polyester resins, polyether resins, polyurethane resins (e.g. carboxylated polyurethane resins), polyurethane alkyd resins, polyurethane-acrylate resins, polyacrylates resins, polyetherurethane resins, styrene acrylate resins, polyvinylalcohol resins, poly(ethylene glycol) resins, polyvinylpyrrolidone resins, polyethyleneimine resins, modified starches, cellulose esters or ethers (such as cellulose acetate and carboxymethyl cellulose), copolymers and mixtures thereof.

According to an embodiment, the thermal drying security inks described herein consist of solvent-based thermal drying security inks comprising one or more resins selected from the group consisting of nitrocelluloses, methyl celluloses, ethyl celluloses, cellulose acetates, polyvinylbutyrals, polyurethanes, polyacrylates, polyamides, polyesters, polyvinyl acetates, rosin modified phenolic resins, phenolic resins, maleic resins, styrene-acrylic resins, polyketone resins, and mixtures thereof.

As mentioned hereabove, dual-cure or dual-hardening security inks may be used for printing the machine readable security feature described herein, wherein these security inks combine two drying or curing mechanisms.

Examples of dual-cure or dual-hardening security inks include oxidative drying mechanisms and UV-Vis curing mechanisms such as for example intaglio printing security inks.

Examples of dual-cure or dual-hardening security inks include oxidative drying mechanisms and thermal drying mechanisms such as for example screen printing security inks, rotogravure printing security inks and flextensional inkjet printing security inks.

Examples of dual-cure or dual-hardening security inks include UV-Vis curing mechanisms and thermal drying mechanisms such as for example screen printing security inks and rotogravure inks. Typically, such these dual-cure or dual-hardening security inks are similar to UV-Vis curable security inks but include a volatile part constituted by water and/or one or more organic solvents. These volatile constituents are evaporated first using hot air and/or IR driers, and UV-Vis curing is then completing the hardening process.

The security inks described herein may further comprise one or more fillers or extenders preferably selected from the group consisting of carbon fibers, talcs, mica (muscovite), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulfides, wood flours, quartz flours, natural fibers, synthetic fibers and combinations thereof. When present, the one or more fillers or extenders are preferably present in an amount from about 0.1 to about 40 wt-%, the weight percents being based on the total weight of the security ink.

The security inks described herein may further comprise one or more coloring agents (pigments or dyes).

The security inks described herein may further comprise one or more IR-absorbers known in the art. The role of said IR-absorbers is for example to slightly modify the reflectance profile of the security feature such as to fully conform to the specifications of the detection system.

The security inks described herein may further comprise one or more luminescent compounds, such as to provide a security feature with enhanced counterfeiting resistance.

The security ink described herein described herein may further comprise one or more marker substances or taggants.

The security ink described herein may further comprise one or more additives, said one or more additives including without limitation compounds and materials which are used for adjusting physical, rheological and chemical parameters of the security ink such as the consistency (e.g. anti-settling agents and plasticizers), the foaming properties (e.g. anti-foaming agents and deaerators), the lubricating properties (waxes), the UV stability (photostabilizers), the adhesion properties, the surface properties (wetting agents, oleophobic and hydrophobic agents), the drying/curing properties (cure accelerators, sensitizers, crosslinkers), etc. Additives described herein may be present in the security inks described herein in amounts and in forms known in the art, including in the form of so-called nano-materials where at least one of the dimensions of the additives is in the range of 1 to 1000 nm.

The present invention further provides methods for producing the security inks described herein and security inks obtained therefrom. The security inks described herein may be prepared by dispersing or mixing the one or more IR absorbing materials described herein and all the other ingredients thus forming liquid or pasty inks. When the security inks described herein are UV-VIS curable security inks, the one or more photoinitiators may be added to the composition either during the dispersing or mixing step of all other ingredients or may be added at a later stage, i.e. after the formation of the liquid or pasty inks. Varnishes, binder compounds, monomers, oligomers, resins and additives are typically chosen among those known in the art and as described hereabove and depend on the printing process used to apply the security ink described herein on the substrate described herein.

The security inks described herein are applied on the substrate described herein for producing a machine readable security feature by a printing process preferably selected from the group consisting of offset processes, intaglio printing processes, screen printing processes, rotogravure processes, flexography processes and flextensional inkjet printing processes, more preferably selected form the group consisting of intaglio printing processes, screen printing processes, rotogravure processes, flexography processes and flextensional inkjet printing processes and still more preferably selected form the group consisting of intaglio printing processes, screen printing processes and rotogravure processes.

The present invention further provides methods for producing the machine readable security features described herein and machine readable security features obtained thereof. The method comprises a step a) of applying by a printing process preferably selected from the group consisting of intaglio printing, screen printing, flexography printing, rotogravure printing and flextensional inkjet printing the security ink described herein onto the substrate described herein.

After having carried out the printing step, a step b) of drying and/or curing the security ink in the presence of UV-VIS radiation and/or air or heat is carried out so as to form the machine readable security feature described herein on the substrate, said step of drying being performed after the step a).

The present invention further provides machine readable security features made of the security ink described herein on the substrate described herein.

The substrates described herein are preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc.

The present invention further provides security documents comprising the substrate described herein and the machine readable security feature described herein or security documents comprising more than one of the machine readable security features described herein. Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like. The term "value commercial good" refers to packaging material, in particular for pharmaceutical, cosmetics, electronics or food industry that may be protected against counterfeiting and/or illegal reproduction in order to warrant the content of the packaging like for instance genuine drugs. Example of these packaging material include without limitation labels such as authentication brand labels, tamper evidence labels and seals. Preferably, the security document described herein is selected from the group consisting of banknotes, identity documents, right-conferring documents, driving licenses, credit cards, access cards, transportation titles, vouchers and secured product labels. Alternatively, the security features described herein may be produced onto an auxiliary substrate such as for example a security thread, security stripe, a foil, a decal, a window or a label and consequently transferred to a security document in a separate step.

With the aim of further increasing the security level and the resistance against counterfeiting and illegal reproduction of security documents, the substrate described herein may contain printed, coated, or laser-marked or laser-perforated indicia, watermarks, security threads, fibers, planchettes, luminescent compounds, windows, foils, decals, primers and combinations of two or more thereof, provided that these potential additional elements do not negatively interfere with the absorption properties in the NIR range spectrum of the machine readable security feature.

With the aim of increasing the durability through soiling or chemical resistance and cleanliness and thus the circulation lifetime of security documents or with the aim of modifying their aesthetical appearance (e.g. optical gloss), one or more protective layers may be applied on top of the machine readable security features or security document described herein. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable. More preferably UV-Vis curable compositions.

The machine readable security features described herein may be provided directly on a substrate on which it shall remain permanently (such as for banknote applications). Alternatively, a machine readable security feature may also be provided on a temporary substrate for production purposes, from which the machine readable security feature is subsequently removed. Thereafter, after hardening/curing of the security ink described herein for the production of the machine readable security feature, the temporary substrate may be removed from the machine readable security feature.

Alternatively, in another embodiment an adhesive layer may be present on machine readable security feature or may be present on the substrate comprising said machine readable security feature, said adhesive layer being on the side of the substrate opposite to the side where the machine readable security feature is provided or on the same side as the machine readable security feature and on top of the machine readable security feature. Therefore an adhesive layer may be applied to the machine readable security feature or to the substrate, said adhesive layer being applied after the drying or curing step has been completed. Such an article may be attached to all kinds of documents or other articles or items without printing or other processes involving machinery and rather high effort. Alternatively, the substrate described herein comprising the machine readable security feature described herein may be in the form of a transfer foil, which can be applied to a document or to an article in a separate transfer step. For this purpose, the substrate is provided with a release coating, on which the machine readable security feature are produced as described herein. One or more adhesive layers may be applied over the so produced drying machine readable security feature.

Also described herein are substrates, security documents, decorative elements and objects comprising more than one, i.e. two, three, four, etc. machine readable security feature described herein. Also described herein are articles, in particular security documents, decorative elements or objects, comprising the machine readable security feature described herein.

As mentioned hereabove, the machine readable security features described herein may be used for protecting and authenticating a security document or decorative elements. Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

The machine readable security features comprising the one or more IR absorbing materials described herein may consist of a pattern, an image, an indicium, a logo, a text, a number, or a code (like a bar code or a QR-code).

According to one embodiment, the substrates, security documents, decorative elements and objects described herein comprise a first portion consisting of the machine readable security feature described herein and made of the security ink comprising the one or more IR absorbing materials described herein and a second portion consisting of a security feature made of an ink comprising one or more compounds absorbing in another region of the electromagnetic spectrum (UV or Vis) so as to form a combined security feature. The first and second portions of the combined security feature described herein may be adjacent, overlapping each other or spaced apart. When the second portion is made of an ink comprising one or more compounds absorbing in the visible region of the electromagnetic spectrum, the global security feature may be conceived in such a way that the first and second portions build an image, both parts being made of inks that are color matched in the visible spectrum.

According to one embodiment, the substrates, security documents, decorative elements and objects described herein comprise a combined security feature, wherein said combined security feature comprises a first portion consisting of the machine readable security feature described herein and made of the security ink comprising the one or more IR absorbing materials described herein and a second portion consisting of a security feature made of a machine readable magnetic ink comprising one or more magnetic compounds so as to form said combined security feature. The first and second portions of the combined security feature described herein may be adjacent, overlapping each other or spaced apart. Preferably, the substrates, security documents, decorative elements and objects described herein comprise the combined security feature, wherein the second portion is made of a machine readable magnetic ink comprising magnetic pigments particles comprising a magnetic core (preferably made of nickel, cobalt, iron and iron containing alloys and oxides) and surrounded by one or more additional layers made of one or more materials selected from the group consisting of organic materials and group of inorganic materials such as those described for example in WO 2010/115986 A2 and WO 2016/005158 A1. The organic materials described herein are preferably selected from the group consisting of polyacrylates, polystyrenes, parylenes, alkoxysilanes and mixtures thereof. The inorganic materials described herein are preferably selected from the group consisting of metals (preferably selected from the group consisting of silver, aluminum and gold), metal oxides (preferably selected from the group consisting of MgO and ZnO, $Al_2O_3$, $Y_2O_3$, $Ln_2O_3$ (wherein Ln is a lanthanide), $SiO_2$, $TiO_2$, $ZrO_2$, $CeO_2$ and mixtures thereof) and metal sulfides (preferably selected from the group consisting of ZnS; CaS and mixtures thereof). Particularly preferred are substrates, security documents, decorative elements and objects described herein comprising the combined security feature, wherein the second portion is made of the machine readable magnetic ink comprising magnetic pigments particles comprising the magnetic core described herein and surrounded by the one or more additional layers made of one or more materials selected from the group consisting of organic materials and group of inorganic materials described herein, wherein the first portion and the second part are made of inks that are color matched in the visible spectrum.

The present invention further provides methods for authenticating a security document comprising the steps of a) providing the security document described herein and comprising the machine readable security feature made of the ink recited described herein; b) illuminating the machine readable security feature at at least two wavelengths, wherein one of said at least two wavelengths is in the visible range (400-700 nm) and another one of said at least two wavelengths is in the NIR range (780 nm-1400 nm), c) detecting the optical characteristics of the machine readable security feature through sensing of light reflected by said machine readable security feature at at least two wavelengths, wherein one of said at least two wavelengths is in the visible range (400-700 nm) and another one of said at least two wavelengths is in the NIR range (780–1400 nm); and d) determining the security document authenticity from the detected optical characteristics of the machine readable security feature.

The authentication of the machine readable security feature described herein and made of the ink described herein may be performed by using an authenticating device comprising one or more light sources, one or more detectors, an analog-to-digital converter and a processor. The machine readable security feature is, simultaneously or subsequently, illuminated by the one or more light sources; the one or more detectors detect the light reflected by said machine readable security feature and output an electrical signal proportional to the light intensity; and the analog-to-digital converter converts said signals into a digital information that is compared by the processor to a reference stored in a database. The authenticating device then outputs a positive signal of authenticity (i.e. the machine readable security feature is genuine) or a negative signal (i.e. the machine readable security feature is fake).

According to one embodiment, the authenticating device comprises a first source (such as a VIS LED) emitting at a first wavelength in the visible range (400-700 nm), a second source (such as an NIR LED) emitting at a second wavelength in the NIR range (780-1400 nm) and a broadband detector (such as a photomultiplier). The first and second sources emit at a time interval, allowing the broadband detector to separately output signals corresponding to the VIS and NIR emissions, respectively. These two signals may be compared separately (the VIS signal with the VIS reference and the NIR signal with the NIR reference). Alternatively, these two signals may be converted to a difference (or ratio) value and said difference (or ratio) value may be compared to the difference (or ratio) reference stored in the database.

According to another embodiment of the detector unit, and with the aim of increasing the operational speed, said detector may comprise two detectors specifically matched to the emission wavelength of the first and second sources (such as a Si photodiode for the visible range and an InGaAs photodiode for the NIR range). The first and second sources emit at the same time, the two detectors sense the light reflected by the security feature at the same time, and the two signals (or their difference or ratio) are compared to references stored in the database.

According to another embodiment, and with the aim of increasing the resistance against counterfeiting, the authenticating device comprises a source emitting at a plurality (i.e. two, three, etc.) of wavelengths in the VIS range and at a plurality (i.e. two, three, etc.) of wavelengths in the NIR range. The sources are sequentially activated, and the light reflected by the machine readable security feature is detected by a broadband detector (such as a photomultiplier). The signals corresponding to the plurality of emission wavelengths are then processed into a complete spectrum, which is compared to a reference spectrum stored in a database.

According to another embodiment, and with the aim of increasing the resistance against counterfeiting as well as increasing the operational speed, the authenticating device comprises a broadband, a continuous light source (such as a tungsten, tungsten halogen or a xenon lamp), a collimation unit, a diffraction grating and a detector array. The diffraction grating is placed in the optical path after the machine readable security feature, wherein the light reflected by said machine readable security feature is focused to the grating by the collimation unit (usually made of a series of lenses and/or an adjustable slit). The detector array is made of a plurality of detector elements, each of them being sensitive to a specific wavelength. In this way, signals corresponding to the light intensity at a plurality of wavelengths are simultaneously obtained, are processed as a complete spectrum and are compared to a reference spectrum in a database.

In another embodiment, and with the aim of acquiring a two-dimensional image of the machine readable security feature described herein, the detector may be a CCD or CMOS sensor. In this case, the range of detectable wavelengths is from about 400 nm to about 1100 nm (which is the upper detection limit of silicium sensors). The machine readable security feature is illuminated sequentially at at least two wavelengths, wherein one of said at least two wavelengths is in the visible range (400-700 nm) and the other one is in the NIR range accessible to the CCD or CMOS detector (780 nm-1100 nm). Alternatively, the CCD or CMOS sensor may be equipped with a filter layer, such that individual pixels of the sensor are sensitive to a different and limited region of the visible (400-700 nm) and NIR spectrum (780-1100 nm). In this case, it is possible to simultaneously obtain two-dimensional images of the machine readable security feature at at least two wavelengths, one in the visible range (400-700 nm) and the other one in the NIR range accessible to the CCD or CMOS detector (780 nm-1100 nm). The two-dimensional images are then compared to reference images stored in a database.

Optionally, the authenticating device may comprise one or more light diffusing elements (like a condenser), one or more lens assemblies (like focusing or collimating lenses), one or more slits (adjustable or not), one or more reflecting elements (like mirrors, especially semi-transparent mirrors) one or more filters (such as polarizing filters) and one or more fiber optics elements.

The skilled person can envisage several modifications to the specific embodiments described above without departing from the spirit of the present invention. Such modifications are encompassed within the present invention.

Further, all documents referred to throughout this specification are hereby incorporated by reference in their entirety as set forth in full herein.

Examples

The present invention is now described in more details with reference to non-limiting examples. The Examples below provide more detail for the preparation and use of security inks for printing a machine readable security feature, said security inks independently comprising an IR absorbing material.

Four types of security inks have been prepared and applied on a substrate:
i) oxidative drying intaglio printing security inks (Examples E1, E2 and comparative Example $C_1$),
ii) UV-Vis curable screen printing security inks (Examples E3, E4 and comparative Example $C_2$),
iii) thermal drying rotogravure printing security inks (Examples E5, E6 and comparative Example $C_3$), and
iv) thermal drying screen printing security inks (Examples E7, E8 and comparative Example $C_4$)
wherein E1, E3, E5 and E7 comprised a crystal water-free iron(II) orthophosphate having a graftonite structure (IR-A 1),
wherein E2, E4, E6 and E8 comprised a crystal water-free potassium iron(II) orthophosphate (IR-A 2), and
wherein $C_1$, $C_2$, $C_3$ and $C_4$ comprised a commercial water-containing iron(II) orthophosphate (IR-A 3).

TABLE 1

| Compound | d10/ μm | d50/ μm | d90/ μm |
| --- | --- | --- | --- |
| IR-A 1 $Fe_3(PO_4)_2$ with a graftonite structure (crystal water-free) | 0.37 | 2.24 | 6.36 |
| IR-A 2 $KFePO_4$ (crystal water-free)) | 0.83 | 2.12 | 3.64 |
| IR-A 3 $Fe_3(PO_4)_2$ (not crystal water-fee) (supplied by Dr. P. Lohmann) | 1.29 | 4.81 | 11.49 |

Structure and Composition of the IR Absorbing Materials IR-A1 and IR-A2

Preparation of the IR-Absorbing Material IR-A 1

A suspension comprising 21.75 kg iron(III) oxide-hydroxide [FeO(OH) or $Fe_2O_3H_2O$], 12.15 kg 98% phosphonic acid ($H_3P_{O3}$), 10.3 kg iron(III) phosphate dihydrate [$FePO_4 \cdot 2H_2O$] and 140 kg water was spray granulated. The so-obtained granulates were temperature treated in a rotary kiln for about 90 minutes in a forming gas atmosphere (5 v/v % $H_2$ in N2 and 750° C.). A nearly colorless product was obtained. The product crystallized in the graftonite structure and was identified using PDF card 00-49-1087. The X-ray diffractogram (XRD) of the IR-absorbing material IR-A 1 is shown in FIG. 1A. The product was ground such that the d50 value (median particle size) was lower than 3 μm using a jet mill (AFG 100 Fluidized Bed Opposed Jet Mill, Hosokawa Alpine). The d10, d50 and d90 provided in Table 1 were obtained by the measurement method described herebelow in distilled water.

Preparation of the IR-Absorbing Material IR-A 2

Figure 1B:
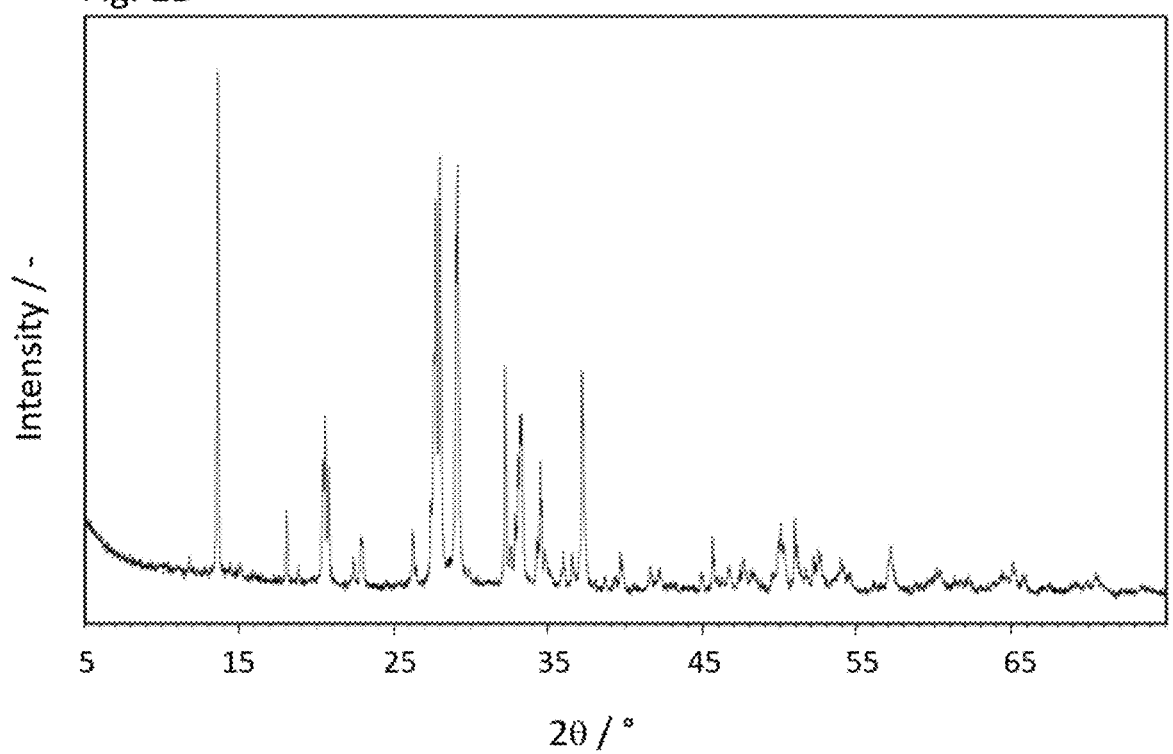

A suspension comprising 11.80 kg iron(III) oxide-hydroxide [FeO(OH) or $Fe_2O_3H_2O$], 10.70 kg 98% phosphoric acid ($H_3PO_3$), 24.8 kg iron(III) phosphate dihydrate [$FePO_4·2\ H_2O$], 29.8 kg 50% lye [KOH], 1.0 kg 75% phosphoric acid [$H_3PO_4$] and 110 kg water was spray granulated. The so-obtained granulates were temperature treated in a rotary kiln for about three hours in a forming gas atmosphere (5 v/v % $H_2$ in $N_2$ and 650° C.). A pale light green product was obtained. The x-ray diffractogram (XRD) of the IR-absorbing material IR-A 2 is shown in FIG. 1B. The product was identified using PDF card 01-076-4615. The product was ground such that the d50 value (median particle size) was lower than 3 μm using a jet mill (AFG 100 Fluidized Bed Opposed Jet Mill, Hosokawa Alpine). The d10, d50 and d90 provided in Table 1 were obtained by the measurement method described herebelow in ethyl acetate.

X-Ray Diffractometry (XRD)

As mentioned hereabove, X-ray diffraction measurements (XRD) were carried out for the two IR-absorbing material IR-A 1 and IR-A 2. A D8 Advance A25-type diffractometer (Bruker) and CuKα radiation was used for said X-ray diffraction measurements (XRD). The products and their crystal structures were identified on the basis of corresponding reference diffractograms (Powder Diffraction Files; PDF) from the ICDD (International Centre for Diffraction Data), previously JCPDS (Joint Committee on Powder Diffraction Standards) database.

Particle Size Distribution

PSD measurements were performed either in water or in ethyl acetate by laser diffractometry (Cilas 1090) according to ISO 13320. Values d10, d50 and d90 were extracted from the particle size distribution curves and are provide in Table 1. The Frauenhofer model was used and the calculations were made with SizeExpert ver. 9.40. D10, d50 and d90 values reported in Table 1 correspond to d(v,10), d(v,50) and d(v,90), respectively.

Analytical Measurement of the Presence of Absence of Crystal Water (FIG. 2)

DSC measurements were independently carried out for IR-A 1 and IR-A 3 using a differential scanning calorimeter (DSC131 Evo, SETARAM) under nitrogen atmosphere, with about 25 mg of the respective IR absorbing material. For each IR absorbing material, two complete measurement cycles were performed. For each cycle, the temperature was raised from about 25° C. to about 385° C. at a rate of about 10° C./min, then the temperature was lowered again to about 25° C. at the same rate.

Figure 2A:
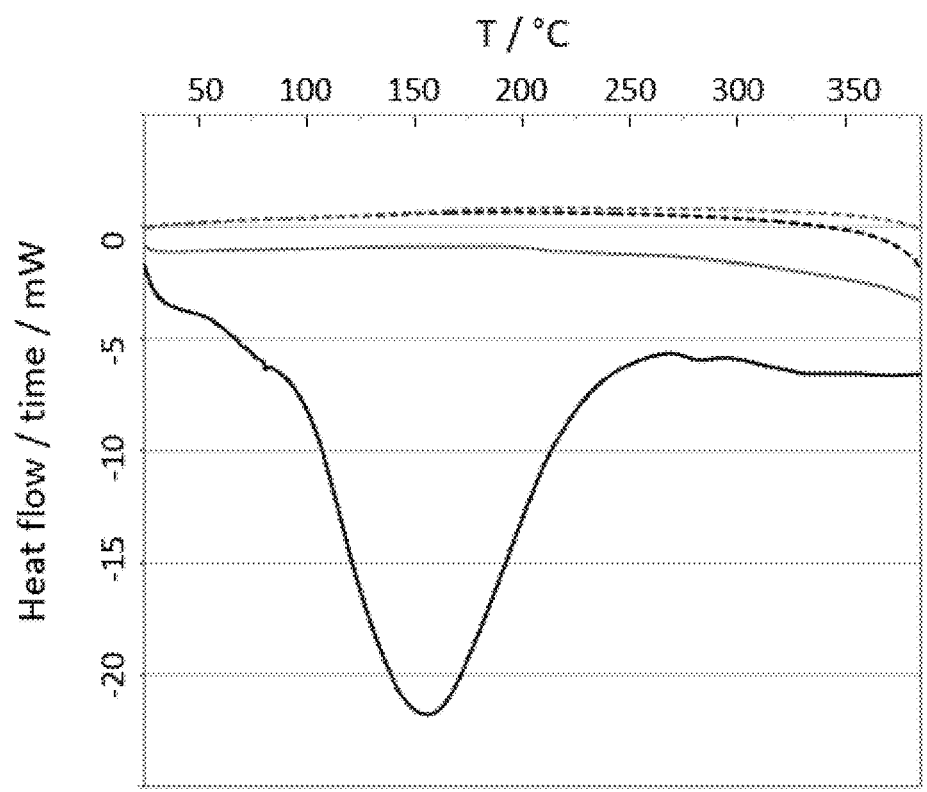
FIGS. 2A and 2B shows DSC curves of $Fe_3(PO_4)_2$ with a graftonite structure and crystal water-free (IR-absorbing material IR-A 1,FIG. 2B) and of not-crystal water-free $Fe_3(PO_4)_2$ (IR-absorbing material IR-A 3, FIG. 2A).
Figure 2B:
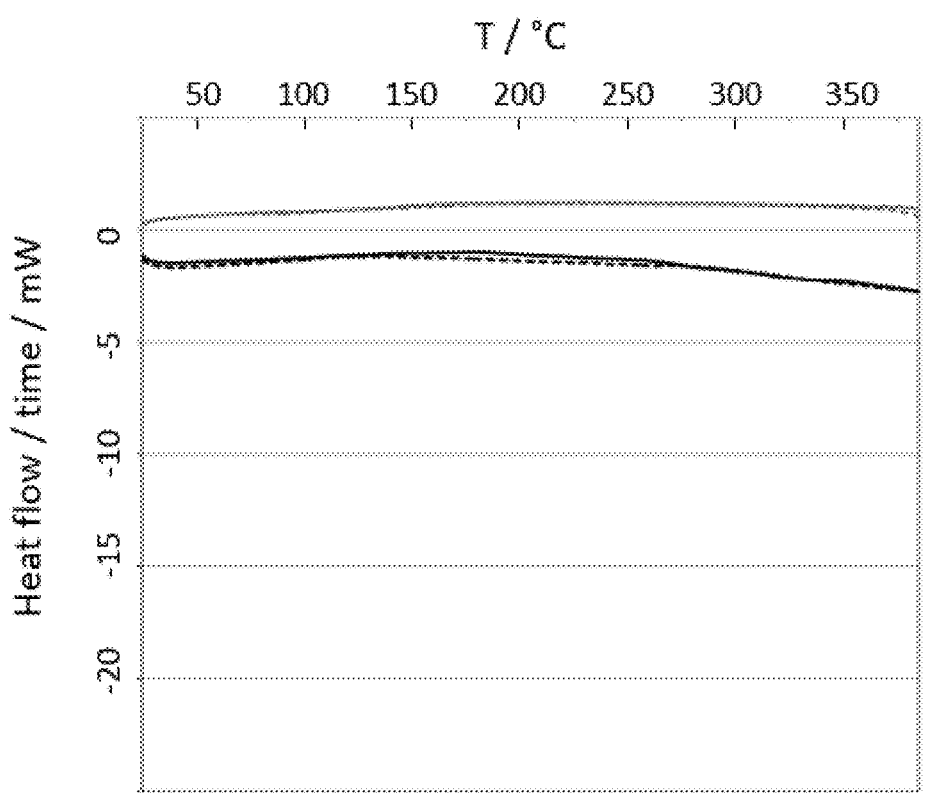

FIGS. 2A and 2B show the obtained DSC curves for both cycles (FIG. 2A: IR-A 3 and FIG. 2B: IR-A 1). As shown in FIG. 2A by the presence of a strong endothermic peak (negative peak) with an extremum at about 150° C., crystal water was extracted from IR-A 3 during the first cycle (black continuous curve corresponding to the cycle where the temperature was increased, and black dotted curve corresponding to the cycle where the temperature was decreased). During the second cycle (grey continuous curve corresponding to the cycle where the temperature was increased, and grey dotted curve corresponding to the cycle where the temperature was decreased), no negative peak was observed. Accordingly, IR-A3 consisted of a not crystal water-fee material.

As shown in FIG. 2B by the absence of any endothermic peak and the superimposition of the curves of the first and second cycles (black continuous curve corresponding to the first cycle where the temperature was increased, black dotted curve corresponding to the first cycle where the temperature was decreased, grey continuous curve corresponding to the second cycle where the temperature was increased, grey dotted curve corresponding to the second cycle where the temperature was decreased), IR-A 1 consisted of a crystal-water free material.

A. Oxidative Drying Intaglio Printing Security Inks (Examples E1, E2 and Comparative Example $C_1$)

A.1. Preparation of the Security Inks (E1, E2 and C1)

The ingredients of Table 2A where independently thoroughly mixed by hand with a spatula to produce the oxidative drying intaglio printing security inks E1, E2 and $C_1$. The so-obtained pasty mixtures were independently ground on a Bühler SDY 200 three-roll mill in four passes (two passes open at 6 bars, one pass closed at 12 bars, and a last pass open at 6 bars). The viscosity was independently measured using a Haake Roto Visco RV1 rotational rheometer, using a cone plate of 20 mm diameter and a 0.5° geometry, at 1000 $s^{-1}$ and 40° C.

TABLE 2A

| Ingredients | Commercial name/supplier | Chemical composition (CAS) | E1/ wt-% | E2/ wt-% | C1/ wt-% |
|---|---|---|---|---|---|
| Varnish 1 Phenolic resin | — | 42.43 wt-% Phenolic modified rosin ester (Bremapal 2035 from Kraemer) cooked in 42.43 wt-% tung oil (8001-20-5 from Interfat), and diluted with 15.14 wt-% n-dodecane (112-40-3 from Univar/Haltermann) | 10.77 | 10.77 | 10.77 |
| Varnish 2 alkyd | Uralac ® AD85/ DSM Neoresins | CAS not provided by supplier | 30.33 | 30.33 | 30.33 |
| Varnish 3 alkyd | Vialkyd ® AR680/ Allnex | CAS not provided by supplier | 13.00 | 13.00 | 13.00 |
| Wax | Carnauba wax/ GE Chaplin | 70 wt-% (8015-86-9) in 30 wt-% (64741-44-2) | 4.70 | 4.70 | 4.70 |
| IR-A 1 | See Table 1 | See Table 1 | 40 | — | — |
| IR-A 2 | See Table 1 | See Table 1 | — | 40 | — |
| IR-A 3 | See Table 1 | See Table 1 | — | — | 40 |
| Drier 1 Co octoate | Octa-Soligen ® Cobalt 12/OMG Borchers | 70 wt-% (36-52-7) 6 wt-% (61789-52-4) in 24 wt-% 64742-47-8 | 0.20 | 0.20 | 0.20 |

TABLE 2A-continued

| Ingredients | Commercial name/supplier | Chemical composition (CAS) | E1/ wt-% | E2/ wt-% | C1/ wt-% |
|---|---|---|---|---|---|
| Drier 2 Mn octoate | Octa-Soligen ® Manganese 8/ OMG Borchers | 50 wt-% (15956-58-8), 2.5 wt-% (8030-70-4), 2.5 wt-% (68515-98-0) 45 wt-% (64742-47-8) | 1.00 | 1.00 | 1.00 |
| Viscosity at 40° C./Pas | | | 8.83 | 10.11 | 20.16 |

A.2. Preparation of the Printed Security Features (E1, E2 and C1)

With the aim of simulating an intaglio printed security feature made from the oxidative drying intaglio printing security inks described in Table 2A, said security inks were independently applied on a piece of fiduciary paper (BNP paper from Louisenthal, 100 g/m$^2$, 4.5 cm×23.3 cm) using a Multipurpose Printability tester MZ-E from Prüfbau. The printed pattern had a size of 20.2 cm×3.9 cm. The amount of the applied security inks (wet) was 8±0.2 g/m$^2$. After the coating/printing step, the security features were allowed to dry seven days at room temperature in the dark.

A.3 Results (E1, E2 and C1)

The influence of the IR-absorbing material present in the oxidative drying intaglio printing security inks on the visible color of the security features was assessed by measuring the L*a*b* values of the printed samples according to CIELAB (1976), L* indicating the lightness of the printed sample, a* and b* being the color coordinates in a Cartesian 2-dimensional space (a*=color value along the red/green axis and b*=color value along the blue/yellow axis). The L*a*b* values were measured with a spectrophotometer DC 45 from Datacolor (measurement geometry: 45/0°; spectral analyzer: proprietary dual channel holographic grating. 256-photodiode linear arrays used for both reference and sample channels; light source: total bandwidth LED illumination). For each security feature, three individual spots were measured. An average value of three measurements of L*a*b* values are provided in Table 2B.

TABLE 2B

| | E1 | E2 | C1 |
|---|---|---|---|
| L* | 92.49 | 92.25 | 79.94 |
| a* | −1.97 | −2.26 | −5.68 |
| b* | 15.48 | 9.16 | 16.61 |
| Color | light beige | light green | dark green |

Figure 3:
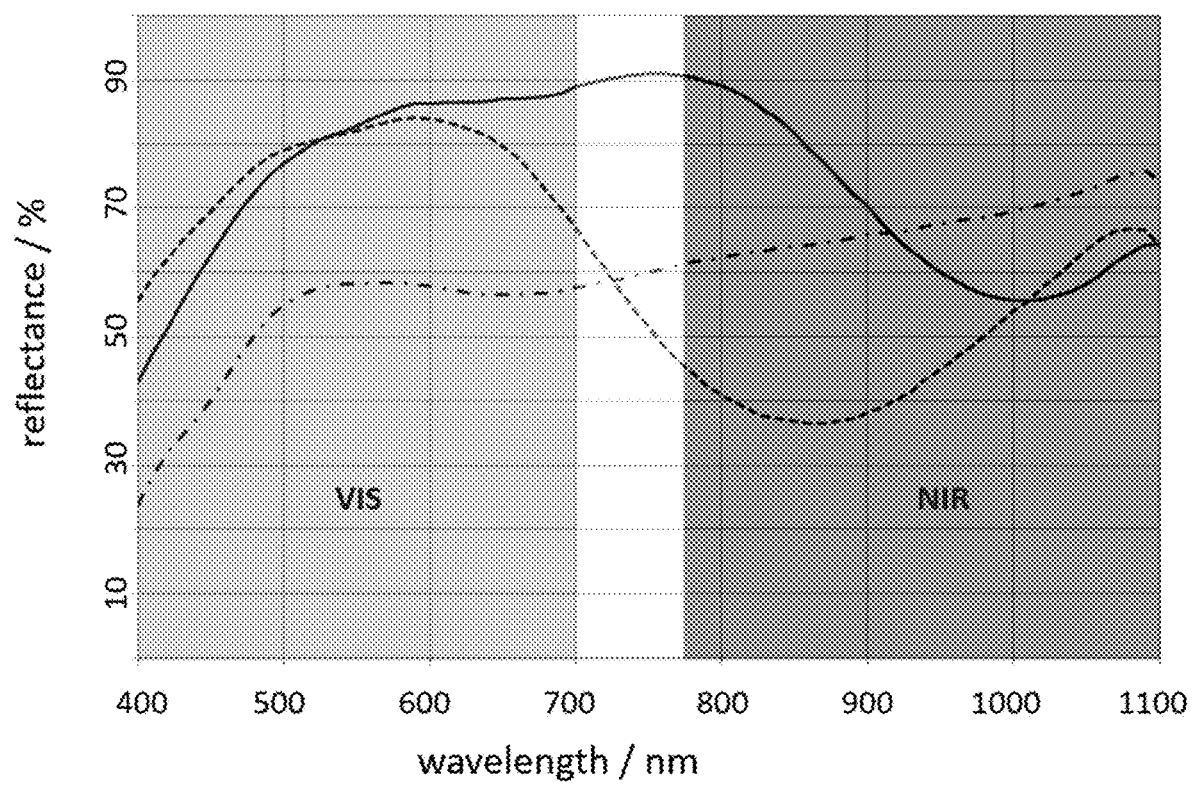
FIG. 3 shows the reflectance curve in the visible range and the NIR range (of a security feature obtained by printing a paper substrate with intaglio inks comprising 40 wt-% of the IR-absorbing materials IR-A 1 (plain line), IR-A 2 (dotted line) and IR-A 3 (dashed/dotted line).

The reflectance spectra of the samples printed with the oxidative drying intaglio printing security inks E1, E2 and C1 were measured with a DC45 from Datacolor between 400 nm and 1100 nm. The 100% reflectance was measured using the internal standard of the device. Reflectance values (in %) at selected wavelengths are provided in Table 2C and the entire spectrum (400-1100 nm) is shown on FIG. 3 (E1-plain line; E2-dotted line and C1-dashed/dotted line).

TABLE 2C

| Reflectance [%] at | E1 | E2 | C1 |
|---|---|---|---|
| 400 nm | 43 | 56 | 23 |
| 500 nm | 77 | 78 | 55 |
| 600 nm | 86 | 83 | 58 |
| 700 nm | 88 | 68 | 58 |
| 800 nm | 89 | 41 | 62 |
| 900 nm | 71 | 38 | 66 |
| 1000 nm | 56 | 54 | 69 |
| 1100 nm | 65 | 65 | 75 |

TABLE 2D

| Reflectance peaks | E1 | E2 | C1 |
|---|---|---|---|
| Vis | Max reflectance: 88% at 700 nm | Max reflectance: 84% at 590 nm | Max reflectance: 58% at 550 nm |
| NIR | Min reflectance: 56% at 1000 nm | Min reflectance: 37% at 860 nm | Min reflectance: 62% at 780 nm |

As shown in Table 2C, the intaglio printed security feature made from the comparative oxidative drying intaglio printing security ink C1 exhibited a low reflectance between about 400 nm and about 1100 nm. As shown in Table 2D, the intaglio printed security feature made from the comparative oxidative drying intaglio printing security ink C1 exhibited almost no difference between the maximum reflectance in the Vis range and the minimum reflectance (i.e. maximum absorption) in the NIR range. The exhibited reflectance values and profile render the detection of said security feature (i.e. machine readable characteristics) impossible by standard detectors such as those featuring high-speed banknote sorting machines, since such detectors rely on the reflectance difference at selected wavelengths in the Vis and the NIR ranges. Moreover, the L*a*b* values of the intaglio printed security feature made from the comparative oxidative drying intaglio printing security ink C1 correspond to a dark green color, making extremely difficult to obtain clean, light colors in the Vis range at the same time as a sufficiently strong absorption in the NIR range.

Contrary to the intaglio printed security feature made from the comparative oxidative drying intaglio printing security ink C1 and, as shown in Table 2C and 2D, the intaglio printed security feature made from the oxidative drying intaglio printing security inks according to the invention (E1 and E2) exhibited a significant difference in reflectance between the Vis and the NIR ranges, thus allowing an easy and reliable detection of said security features at high speed. The intaglio printed security feature made from the oxidative drying intaglio printing security ink according to the invention E1 differed from the security feature made from the intaglio printed security feature made from the oxidative drying intaglio printing security ink according to the invention E2 by their respective NIR reflectance profile.

In particular, the minimum reflectance occurred at 1000 nm for the intaglio printed security feature made from the oxidative drying intaglio printing security ink according to the invention E1 whereas the minimum reflectance occurred at 850 nm for the intaglio printed security feature made from the oxidative drying intaglio printing security ink according to the invention E2. The L*a*b* values of the intaglio printed security feature made from the oxidative drying intaglio printing security ink according to the invention E1 correspond to a light beige color and those of the intaglio printed security feature made from the oxidative drying intaglio printing security ink according to the invention E2 correspond to a light green color. Accordingly, the intaglio printed security feature made from the oxidative drying intaglio printing security inks according to the invention (E1 and E2) exhibited a clear and light color in the Vis range in combination a sufficiently strong absorption in the NIR range.

B. UV-Vis Curable Screen Printing Security Inks (Examples E3, E4 and Comparative Example C2)

B.1. Preparation of the Security Inks (E3, E4 and C2)

The ingredients of the ink vehicle described in Table 3A were mixed and dispersed at room temperature using a Dispermat (LC220-12) during ten minutes at 1500 rpm.

200 g of the IR absorbing material (IR-A1, IR-A2 and IR-A3, respectively) were independently added to 800 g of the ink vehicle described in Table 3A and dispersed for ten minutes at 1500 rpm so as to independently obtain one kg of the UV-Vis curable screen printing security inks E3, E4 and C2 described in Table 3B. The viscosities provided in Table 3B were measured on nine g of the UV-Vis curable screen printing security inks E3, E4 and C2 at 25° C. on a Brookfield machine (model "DV-I Prime", small sample adapter, spindle SC4-21 at 50 rpm).

TABLE 3A

| Ingredients | Commercial name/ supplier | Chemical composition (CAS) | wt-% |
| --- | --- | --- | --- |
| UV oligomer acrylated epoxy resin | Ebecryl ® 2959/ Allnex | 76.6 wt-% (55818-57-0), 23.0 wt-% (52408-84-1), 0.3 wt-% (25068-38-6), 0.1 wt-% (57472-68-1) | 33.4 |
| UV monomer 1 acrylate | TMPTA/ Allnex | (15625-89-5) | 23.4 |
| UV monomer 2 acrylate | TPGDA/ Allnex | (42978-66-5) | 24 |
| Polymerization inhibitor | Genorad ® 16/ Rahn | 37.5 wt-% (52408-84-1), 37.5 wt-% (55818-57-0), 14.6 wt-% active ingredient (CAS not provided by supplier), 7.5 wt-% (128-37-0), 2.9 wt-% (150-76-5) | 1.2 |
| Inorganic extender | Aerosil ® 200/ Evonik | (7631-86-9) | 1.2 |
| Photoinitiator 1 | Speedcure TPO-L/ Lambson | (84434-11-7) | 2.4 |
| Photoinitiator 2 | Omnirad 500/ IGM Resins | 50 wt-% (119-61-9), 50 wt-% (947-19-3) | 7.2 |
| Photoinitiator 3 | Genocure* EPD/Rahn | (10287-53-3) | 2.4 |
| Wetting agent | BYK-371/ Byk | 41 wt-% active ingredient (CAS not provided by supplier) in 42 wt-% (1330-20-7) and 17 wt-% (100-41-4) | 2.4 |
| Anti-foaming agent | Tego ® Foamex N/ Evonik | CAS not provided by supplier | 2.4 |

TABLE 3B

| Ingredients | ink vehicle described of Table 3A/wt-% | IR-A 1/ wt-% | IR-A 2/ wt-% | IR-A 3/ wt-% | Viscosity at 25° C./ Pas |
|---|---|---|---|---|---|
| E3 | 80 | 20 | — | — | 0.67 |
| E4 | 80 | — | 20 | — | 0.56 |
| C2 | 80 | — | — | 20 | 1.10 |

B.2 Preparation of the Printed Security Features (E3, E4 and C2)

With the aim of preparing a screen printed security feature made from the UV-Vis curable screen printing security inks of Table 3B, said security inks were independently applied by hand on a piece of fiduciary paper (BNP paper from Louisenthal, 100 g/m², 14.5 cm×17.5 cm) using a 90T screen (230 mesh). The printed pattern had a size of 6 cm×10 cm. After the printing step, the security features were cured by independently exposing for about two second to UV-curing the printed security features a UV-LED-lamp from Phoseon (Type FireFlex 50×75 mm, 395 nm, 8 W/cm²).

B.3 Results (E3, E4 and C2)

The influence of the IR-absorbing material present in the UV-Vis curable screen printing security inks on the visible color of the security features was assessed by measuring the L*a*b* values of the printed samples according to CIELAB (1976) as described hereabove. For each security feature, three individual spots were measured. An average value of three measurements of L*a*b* values are provided in Table 3C.

TABLE 3C

|  | E3 | E4 | C2 |
|---|---|---|---|
| L* | 91.9 | 91.7 | 68.8 |
| a* | −1.51 | −2.81 | −8.92 |
| b* | 10.21 | 8.98 | 16.14 |
| Color | light beige | light green | dark green |

The reflectance spectra of the samples printed with the UV-Vis curable screen printing security inks E3, E4 and C2 were measured with a DC45 from Datacolor, between 400 nm and 1100 nm. The 100% reflectance was measured using the internal standard of the device. Reflectance values (in %) at selected wavelengths are provided in Table 3D.

TABLE 3D

| Reflectance [%] at | E3 | E4 | C2 |
|---|---|---|---|
| 400 nm | 42 | 43 | 12 |
| 500 nm | 80 | 82 | 40 |
| 600 nm | 85 | 84 | 38 |
| 700 nm | 87 | 75 | 38 |
| 800 nm | 85 | 35 | 41 |
| 900 nm | 55 | 34 | 45 |
| 1000 nm | 38 | 42 | 52 |
| 1100 nm | 47 | 57 | 60 |

TABLE 3E

| Reflectance peaks | E3 | E4 | C2 |
|---|---|---|---|
| Vis | Max reflectance: 87% at 700 nm | Max reflectance: 85% at 580 nm | Max reflectance: 41% at 520 nm |
| NIR | Min reflectance: 38% at 1000 nm | Min reflectance: 33% at 850 nm | Min reflectance: 41% at 800 nm |

As shown in Table 3D, the screen printed security feature made from the comparative UV-Vis curable screen printing security ink C2 exhibited a low reflectance between about 400 nm to about 1100 nm. As shown in Table 3E, the screen printed security feature made from the comparative UV-Vis curable screen printing security ink C2 exhibited no difference between the maximum reflectance in the Vis range and the minimum reflectance in the NIR range. The exhibited reflectance values and profile render the detection of said security feature (i.e. machine readable characteristics) impossible by standard detectors such as those featuring high-speed banknote sorting machines, since such detectors rely on the reflectance difference at selected wavelengths in the VIS and the NIR ranges. Moreover, the L*a*b* values of the screen printed security feature made from the comparative UV-Vis curable screen printing security ink C2 correspond to a dark green color, making extremely difficult to obtain clean, light colors in the Vis range at the same time as a sufficiently strong absorption in the NIR range.

Contrary to the screen printed security feature made from the comparative UV-Vis curable screen printing security ink C2 and, as shown in Table 3D, the screen printed security feature made from the UV-Vis curable screen printing security inks according to the invention (E3 and E4) exhibited a significant difference in reflectance between the VIS and the NIR ranges, thus allowing an easy and reliable detection of said security features at high speed. The screen printed security feature made from the UV-Vis curable screen printing security ink according to the invention E3 differed from the security feature made from the screen printed security feature made from the UV-Vis curable screen printing security ink according to the invention E4 by their respective NIR reflectance profile. In particular, the minimum reflectance occurred at 1000 nm for the screen printed security feature made from the UV-Vis curable screen printing security ink according to the invention E3 whereas the minimum reflectance occurred at 850 nm for the screen printed security feature made from the UV-Vis curable screen printing security ink according to the invention E4. The L*a*b* values of the screen printed security feature made from the UV-Vis curable screen printing security ink according to the invention E3 correspond to a light beige color and those of the screen printed security feature made from the UV-Vis curable screen printing security ink according to the invention E4 correspond to a light green color. Accordingly, the screen printed security feature made from the UV-Vis curable screen printing security inks according to the invention (E3 and E4) exhibited a clear and light color in the Vis range in combination a sufficiently strong absorption in the NIR range.

C. Thermal Drying Rotogravure Printing Security Inks (Examples E5, E6 and Comparative Example C3)

C.1. Preparation of the Security Inks (E5, E6, C3)

The ingredients of the ink vehicle described in Table 4A were mixed and dispersed at room temperature using a Dispermat (LC220-12) during ten minutes at 500 rpm.

150 g of the IR absorbing material (IR-A1, IR-A2 and IR-A3, respectively) were independently added to 850 g of the ink vehicle described in Table 4A and dispersed for ten minutes at 1200 rpm and one minute at 1550 rpm so as to independently obtain one kg of the thermal drying rotogravure printing security inks E5, E6 and C3 described in Table 4B. The viscosities at 25° C. and 1000 s$^{-1}$ provided in Table 4B of the thermal drying rotogravure printing security inks E5, E6 and C3 were determined using a rotational viscosimeter DHR-2 from TA Instruments (cone-plane geometry, diameter 40 mm).

TABLE 4A

| Ingredients | Commercial name/supplier | Chemical composition (CAS) | wt-% |
|---|---|---|---|
| Solvent | Ethylacetate 99-100%/ Brenntag | (141-78-6) | 48.7 |
| Solvent | N-propylacetate 99-100%/ Thommen-Furler | (109-60-4) | 29.6 |
| Resin hydroxyl-containing copolymer of vinyl chloride carbon acid esters | Vinnol ® E 22/48 A/Wacker | (114653-42-8) | 12.8 |
| Resin acrylic resin | Acronal ® 4F/ BASF | CAS not provided by supplier | 7.4 |
| Inorganic extender | Aerosil ® 200/ Evonik | (7631-86-9) | 1.5 |

TABLE 4B

| Ingredients | ink vehicle described of Table 4A/wt-% | IR-A 1/ wt-% | IR-A 2/ wt-% | IR-A 3/ wt-% | Viscosity at 25° C./ Pas |
|---|---|---|---|---|---|
| E4 | 85 | 15 | — | — | 0.027 |
| E5 | 85 | — | 15 | — | 0.024 |
| C3 | 85 | — | — | 15 | 0.035 |

C.2 Preparation of the printed security features (E5, E6, C3)

With the aim of simulating a rotogravure printed security feature printed with from thermal drying rotogravure printing security inks of Table 4B, said security inks were independently applied by hand on a piece of fiduciary paper (BNP paper from Louisenthal, 100 g/m$^2$, 14.5 cm×17.5 cm) using a hand coater equipped with bar no 2. The printed pattern had a size of 10 cm×12 cm. After the coating/printing step, the security features were dried during one minute with a hot air drier at about $_{50}$° C.

C.3 Results (E5, E6, C$_3$)

The influence of the IR-absorbing material present in the thermal drying rotogravure printing security inks on the visible color of the security features was assessed by measuring the L*a*b* values of the printed samples according to CIELAB (1976) as described hereabove. For each security feature, three individual spots were measured. An average value of three measurements of L*a*b* values are provided in Table 4C.

TABLE 4C

|  | E5 | E6 | C3 |
|---|---|---|---|
| L* | 93.8 | 93.6 | 82.6 |
| a* | 0.18 | −0.88 | −5.99 |
| b* | −0.38 | 1.16 | 9.36 |
| Color | uncolored | uncolored | green |

The reflectance spectra of the samples printed with the thermal drying rotogravure printing security inks E5, E6 and C3 were measured with a DC45 from Datacolor, between 400 nm and 1100 nm. The 100% reflectance was measured using the internal standard of the device. Reflectance values (in %) at selected wavelengths are provided in Table 4D.

TABLE 4D

| Reflectance [%] at | E5 | E6 | C3 |
|---|---|---|---|
| 400 nm | 50 | 50 | 23 |
| 500 nm | 86 | 85 | 63 |
| 600 nm | 84 | 84 | 60 |
| 700 nm | 88 | 72 | 60 |
| 800 nm | 89 | 45 | 65 |
| 900 nm | 74 | 42 | 69 |
| 1000 nm | 60 | 60 | 73 |
| 1100 nm | 71 | 74 | 82 |

TABLE 4E

| Reflectance peaks | E5 | E6 | C3 |
|---|---|---|---|
| Vis | Max reflectance: 88% at 700 nm | Max reflectance: 85% at 500 nm | Max reflectance: 63% at 520 nm |
| NIR | Min reflectance: 60% at 1000 nm | Min reflectance: 40% at 850 nm | Min reflectance: 65% at 800 nm |

As shown in Table 4D, the rotogravure printed security feature made from the comparative thermal drying rotogravure printing security ink C3 exhibited a low reflectance between about 400 nm to about 1100 nm. As shown in Table 4E, the rotogravure printed security feature made from the comparative thermal drying rotogravure security printing ink C3 exhibited no difference between the maximum reflectance in the Vis range and the minimum reflectance in the NIR range. The exhibited reflectance values and profile render the detection of said security feature (i.e. machine readable characteristics) impossible by standard detectors such as those featuring high-speed banknote sorting machines, since such detectors rely on the reflectance difference at selected wavelengths in the Vis and the NIR ranges. Moreover, the L*a*b* values of the rotogravure printed security feature made from the comparative thermal drying rotogravure printing security ink C3 correspond to a green color, making extremely difficult to obtain clean, light colors in the Vis range at the same time as a sufficiently strong absorption in the NIR range.

Contrary to the rotogravure printed security feature made from the comparative thermal drying rotogravure printing security ink C3 and, as shown in Table 4D, the rotogravure printed security feature made from the thermal drying rotogravure printing security inks according to the invention (E5 and E6) exhibited a significant difference in reflectance between the Vis and the NIR ranges, thus allowing an easy and reliable detection of said security features at high speed. The rotogravure printed security feature made from the thermal drying rotogravure security printing ink according to the invention E5 differed from the security feature made from the rotogravure printed security feature made from the thermal drying rotogravure printing security ink according to the invention E6 by their respective NIR reflectance profile. In particular, the minimum reflectance occurred at 1000 nm for the rotogravure printed security feature made from the comparative thermal drying rotogravure security printing ink according to the invention E5 whereas the minimum reflectance occurred at 850 nm for the rotogravure printed security feature made from the thermal drying rotogravure security printing ink E6. The L*a*b* values of the rotogravure printed security feature made from the thermal drying rotogravure printing security inks according to the invention (E5 and E6) are those of uncolored samples. Accordingly, the rotogravure printed security feature made from the thermal drying rotogravure printing security inks according to the invention (E5 and E6) exhibited a clear and light color in the Vis range in combination a sufficiently strong absorption in the NIR range.

The invention claimed is:

1. A security ink for printing a machine readable security feature, said security ink comprising one or more IR absorbing materials selected from the group consisting of
a crystal water-free iron(II) metal orthophosphate of the general formula $KFePO_4$,
crystal water-free iron(II) metal phosphonates,
crystal water-free iron(II) metal pyrophosphates,
crystal water-free iron(II) metal metaphosphates of the general formula $Fe_aMet_b(PO_c)_d$, where a is a number from 1 to 5, b is a number from >0 to 5, c is a number from 2.5 to 5, d is a number from 0.5 to 3 and Met represents one or more metals selected from the group consisting of Li, Na, K, Rb, Cs, Mg, Sr, Ba, Sc, Y, La, Ti, Zr, Hf, Nb, Ta, Cr, Mo, W, Mn, Cu, Zn, Co, Ni, Ag, Au, B, Al, Ga, In, Si, Sn, Sb, Bi and the lanthanoids, and
mixtures thereof,
wherein said security ink is
an oxidative drying security ink comprising from about 0.01 wt-% to about 10 wt-% of one or more driers, the weight percents being based on a total weight of the oxidative drying security ink, or
a UV-Vis curable security ink comprising from about 0.1 wt-% to about 20 wt-% of one or more photoinitiators, the weight percents being based on a total weight of the UV-Vis curable security ink, or
a thermal drying security ink comprising from about 10 wt-% to about 90 wt-% of one or more solvents selected from the group consisting of organic solvents, water and mixtures thereof, the weight percents being based on a total weight of the thermal drying security ink, or
a combination thereof.

2. The security ink according to claim 1, wherein the oxidative drying security ink is an oxidative drying offset printing security ink or an oxidative drying intaglio printing security ink.

3. The security ink according to claim 1, wherein the UV-Vis curable security ink is a UV-Vis curable offset printing security ink, a UV-Vis curable intaglio printing security ink, a UV-Vis curable screen printing security ink, a UV-Vis curable flexography printing security ink, a UV-Vis curable rotogravure printing security ink or a UV-Vis curable flextensional inkjet printing security ink.

4. The security ink according to claim 1, wherein the thermal drying security ink is a thermal drying screen printing security ink, a thermal drying flexography printing thermal security ink, a thermal drying rotogravure printing security ink or a flextensional inkjet printing thermal drying flextensional inkjet printing security ink.

5. The security ink according to claim 1, wherein the one or more IR absorbing materials are $Fe_aMet_b(PO_c)_d$, wherein Met represents potassium (K), magnesium (Mg) and zinc (Zn) or a combination thereof.

6. The security ink according to claim 1, wherein each of the one or more IR absorbing materials has an average particle size (d50) between about 0.01 and about 50 μm.

7. The security ink according to claim 1, wherein the one or more IR absorbing materials are present in an amount from about 5 wt-% to about 60 wt-%, the wt-% being based on a total amount of the security ink.

8. The security ink according to claim 1, wherein the one or more IR absorbing materials are prepared by a method comprising the followings steps:
a) manufacturing a mixture containing:
i) iron compounds (A) selected from Fe(III) compounds, Fe(III)/Fe(II) compounds and mixtures of these in a percentage of about 20 wt-% to about 90 wt-% by weight of the mixture, selected from the group consisting of oxides, hydroxides, oxide hydroxides, carbonates, carboxylates such as oxalates, formates, acetates, citrates, lactates, orthophosphates, phosphonates, metaphosphonates, pyrophosphates, sulfates and mixtures thereof,
ii) reduction agents (B) in a percentage of about 5 wt-% to about 50 wt-% by weight of the mixture, selected from the group consisting of phosphonic acid [$H_3PO_3$], phosphorus trioxide [$P_2O_3$], phosphinic acid [$H_3PO_2$], phosphorus tetroxide [$P_2O_4$], hypodiphosphoric acid [$H_4P_2O_6$], diphosphoric acid [$H_4P_2O_5$], hypodiphosphonic acid [$H_4P_2O_4$], Fe salts and Met salts of the above mentioned acids, and mixtures thereof as solids, aqueous solutions or suspensions,
iii) optional phosphate donor (C) in a percentage of about 0 wt-% to about 50 wt-% by weight of the mixture, selected from the group consisting of phosphoric acid [$H_3PO_4$] as an aqueous solution, metal phosphate [$Met_x(PO_4)z$] or acid metal phosphate [$Met_xH_y(PO_4)_z$] with 1≥x≥4, 1≥y≥5 and 1≥z≥4 as a solid or aqueous solutions or suspension, diphosphoric acid [$H_4P_2O_7$], metaphosphoric acid [$(HPO_3)_n$] with n≥3 or their salts, phosphorus pentoxide [$P_2O_5$], and mixtures thereof, and
iv) optional metal (M) donor (D) in a percentage of about 0 wt-% to about 50 wt-% by weight of the mixture, selected from metal compounds of one or more metals from the group consisting of K, Rb, Cs, Mg, Ca, Sr, Ba, Sc, Y, La, Ti, Zr, Hf, Nb, Ta, Cr, Mo, W, Mn, Cu, Zn, B, Al, Ga, In, Si, Sn, Sb, Bi, and the lanthanoids, and selected from the group consisting of oxides, hydroxides, oxide hydroxides, carbonates, oxalates, formates, acetates, citrates, lactates, orthophosphates, pyrophosphates and sulfates of the above mentioned metals and mixtures thereof,
wherein the weight percentage of each of the components (A) to (D) of the mixture is based on a percentage of each of the components (A) to (D) not including any solvent and/or suspension agent,
b) obtaining the mixture, wherein the mixture contains aqueous and/or organic solvents, and is dried at a temperature of less than about 400° C., and
c) treating the dry or dried mixture at a temperature between about 400 and about 1200° C.

9. A machine readable security feature made from the security ink recited in claim 1.

10. A security document comprising the machine readable security feature recited in claim 9.

11. The security document according to claim 10, wherein the security document comprises the machine readable security feature as a first portion, and wherein the security document further comprises a second portion consisting of a security feature made of an ink comprising one or more compounds absorbing in another region of the electromagnetic spectrum (UV or Vis) or consisting of a security feature made of a machine readable magnetic ink comprising one or more magnetic compounds.

12. A method for producing a machine readable security feature comprising a step a) of applying by a printing process selected from the group consisting of offset printing, intaglio printing, screen printing, flexography printing, rotogravure printing and flextensional inkjet printing, the security ink recited in claim 1 onto a substrate.

13. The method according to claim 12, further comprising a step b) of drying and/or curing the security ink in the presence of UV-Vis radiation and/or air or heat so as to form the security feature on the substrate, said step of drying being performed after the step a).

14. The method according to claim 12, wherein the substrate is selected from the group consisting of papers or other fibrous materials, paper-containing materials, glasses, metals, ceramics, plastics and polymers, metalized plastics or polymers, composite materials and mixtures or combinations thereof.

15. A method for authenticating a security document comprising the steps of:
   a) providing the security document recited in claim 10;
   b) illuminating the machine readable security feature at at least two wavelengths, wherein one of said at least two wavelengths is in the visible range and another one of said at least two wavelengths is in the NIR range,
   c) detecting the optical characteristics of the machine readable security feature through sensing of light reflected by said machine readable security feature at at least two wavelengths, wherein one of said at least two wavelengths is in the visible range and another one of said at least two wavelengths is in the NIR range, and
   d) determining the security document authenticity from the detected optical characteristics of the machine readable security feature.

16. The security ink according to claim 1, wherein the oxidative drying security ink is an oxidative drying intaglio printing security ink.

17. The security ink according to claim 1, wherein the UV-Vis curable security ink is a UV-Vis curable intaglio printing security ink, a UV-Vis curable screen printing security ink, a UV-Vis curable flexography printing security ink, a UV-Vis curable rotogravure printing security ink or a UV-Vis curable flextensional inkjet printing security ink.

18. The security ink according to claim 1, wherein the one or more IR absorbing materials are $KFePO_4$, $K(Fe_{0.75}Zn_{0.25})PO_4$ or $K(Fe_{0.75}Mg0.25)PO_4$.

19. The security ink according to claim 1, wherein each of the one or more IR absorbing materials has an average particle size (d50) between about 0.1 μm and about 20 μm.

20. The security document according to claim 11, wherein the first portion and the second portion are made of inks that are color matched in the visible spectrum.

* * * * *